United States Patent
Yamaguchi

[11] Patent Number: 5,831,257
[45] Date of Patent: Nov. 3, 1998

[54] NON-CONTACT IC CARD INCLUDING PHASE-LOCKED LOOP CIRCUITRY

[75] Inventor: Atsuo Yamaguchi, Tokyo, Japan

[73] Assignee: Mitsubishi Denki Kabushiki Kaisha, Tokyo, Japan

[21] Appl. No.: 904,360

[22] Filed: Aug. 1, 1997

Related U.S. Application Data

[62] Division of Ser. No. 538,890, Oct. 4, 1995, Pat. No. 5,698,838.

[30] Foreign Application Priority Data

| Oct. 6, 1994 | [JP] | Japan | 6-243097 |
| Dec. 12, 1994 | [JP] | Japan | 6-307834 |
| Jun. 14, 1995 | [JP] | Japan | 7-147817 |
| Sep. 22, 1995 | [JP] | Japan | 7-244738 |

[51] Int. Cl.⁶ .................................................. G06K 19/06
[52] U.S. Cl. .................... 235/492; 235/439; 340/825.34; 340/825.54
[58] Field of Search ................................ 235/492, 380, 235/439, 449, 454; 340/825.34, 825.54; 343/742

[56] References Cited

U.S. PATENT DOCUMENTS

| 4,298,793 | 11/1981 | Melis et al. | 235/492 X |
| 4,388,524 | 6/1983 | Walton | 235/380 |
| 4,546,241 | 10/1985 | Walton | 235/380 |
| 4,797,541 | 1/1989 | Billings et al. | 235/449 |
| 4,814,595 | 3/1989 | Gilboa | 235/492 |
| 4,837,556 | 6/1989 | Matsushita et al. | 340/310 R |
| 4,845,347 | 7/1989 | McCrindle et al. | 235/380 |
| 4,918,296 | 4/1990 | Fujisaka et al. | 235/380 |
| 4,918,416 | 4/1990 | Walton et al. | 235/497 |
| 4,962,485 | 10/1990 | Kato et al. | 365/229 |
| 5,013,898 | 5/1991 | Glasspool | 235/449 |
| 5,105,190 | 4/1992 | Kip et al. | 340/825.54 |
| 5,126,745 | 6/1992 | Steinhagen et al. | 342/51 |
| 5,170,046 | 12/1992 | Kusakabe | 235/492 |
| 5,226,167 | 7/1993 | Yamaguchi | 235/449 X |
| 5,227,740 | 7/1993 | Steinhagen et al. | 331/166 |
| 5,241,160 | 8/1993 | Bashan et al. | 235/380 |
| 5,308,968 | 5/1994 | Yamaguchi | 235/492 |
| 5,326,965 | 7/1994 | Inoue | 235/492 |
| 5,349,173 | 9/1994 | Scheckel et al. | 235/492 |
| 5,362,954 | 11/1994 | Komatsu | 235/492 |
| 5,382,778 | 1/1995 | Takahira et al. | 235/492 X |
| 5,396,056 | 3/1995 | Yamaguchi | 235/492 |
| 5,418,358 | 5/1995 | Bruhnke et al. | 235/492 |
| 5,434,396 | 7/1995 | Owen et al. | 235/380 |
| 5,436,441 | 7/1995 | Inoue | 235/487 |
| 5,444,222 | 8/1995 | Inoue | 235/380 |
| 5,451,763 | 9/1995 | Pickett et al. | 235/492 |
| 5,652,423 | 7/1997 | Saitoh et al. | 235/492 |

FOREIGN PATENT DOCUMENTS

| 0281142 | 9/1988 | European Pat. Off. |
| 0453314 | 10/1991 | European Pat. Off. |
| 3707173 | 9/1987 | Germany |
| 58-151722 | 9/1983 | Japan |
| 58-154080 | 9/1983 | Japan |
| 58-154081 | 9/1983 | Japan |
| 5128319 | 5/1993 | Japan |
| 5135224 | 6/1993 | Japan |
| WO8905067 | 6/1989 | WIPO |

*Primary Examiner*—Donald T. Hajec
*Assistant Examiner*—Michael G. Lee
*Attorney, Agent, or Firm*—Leydig, Voit & Mayer

[57] ABSTRACT

A non-contact IC card includes an antenna resonance circuit including two output terminals; and a phase locked loop (PLL) for receiving, as an input signal, a signal representative of a received signal received by the IC card and changing to a negative state, and for producing an output tuned to the input signal, wherein, for phase modulation or demodulation, an output signal for half a period is produced as the output of the PLL and both terminals of an antenna resonance circuit are short-circuited during the half period from a zero crossing point of the input signal.

1 Claim, 36 Drawing Sheets

FIG. 34
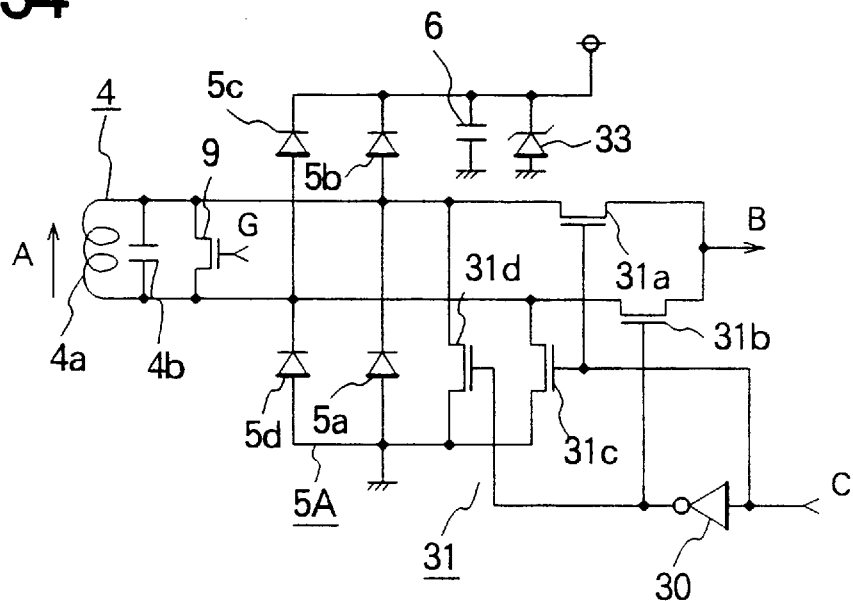
FIG. 35
A
B
C
G FIG. 36A
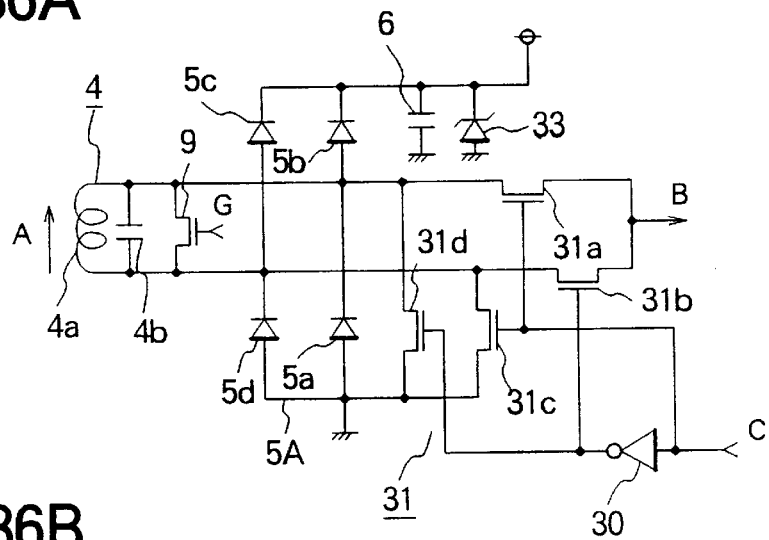
FIG. 36B
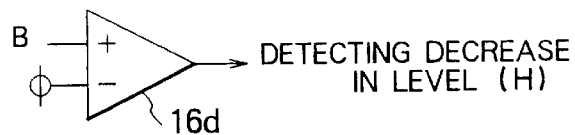
FIG. 37
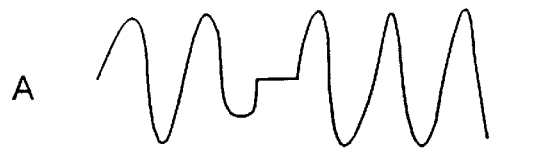
A
B
C
H
G

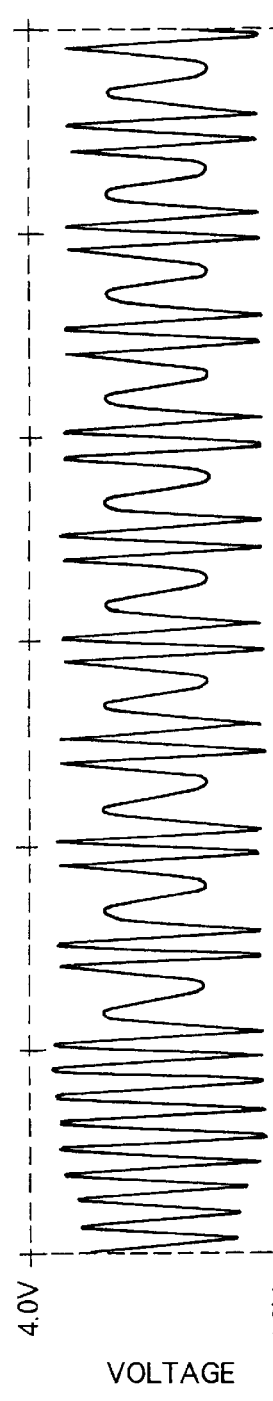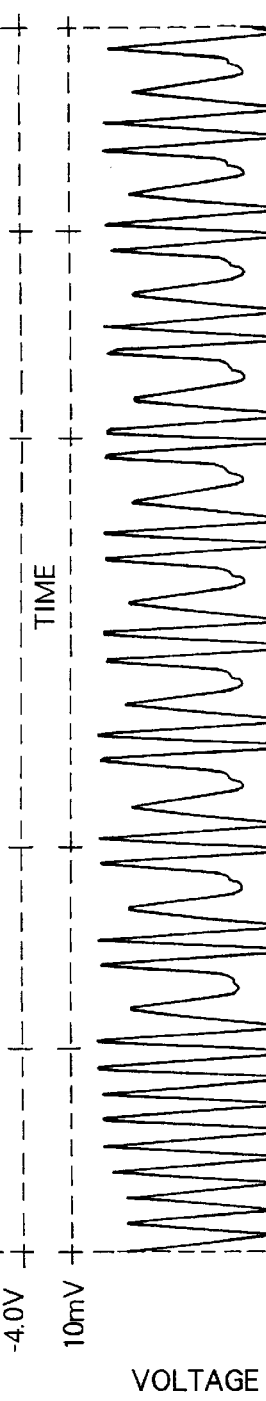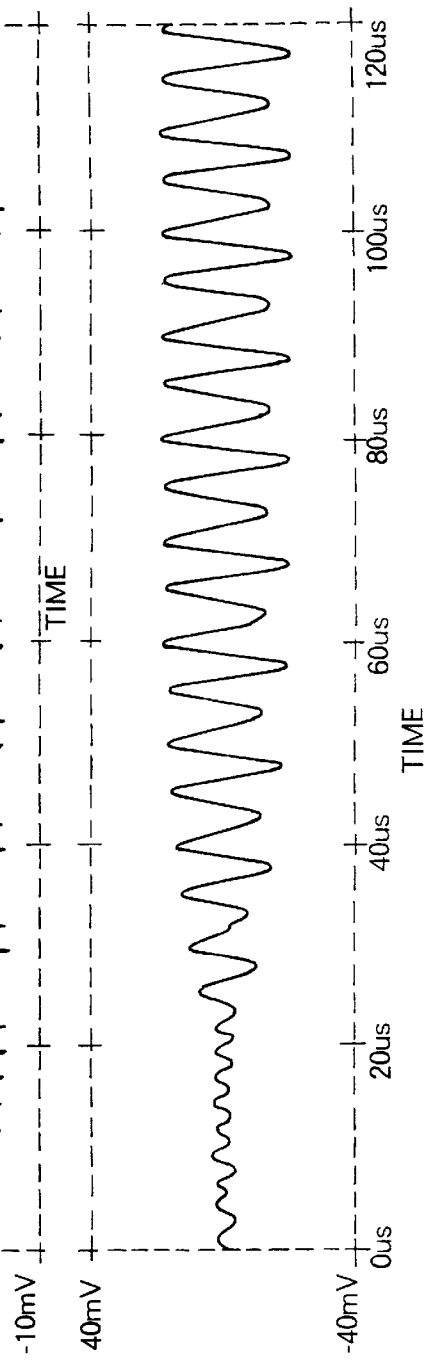

NON-CONTACT IC CARD INCLUDING PHASE-LOCKED LOOP CIRCUITRY

This application is a division of patent application Ser. No. 08/538,890, filed Oct. 4, 1995, now U.S. Pat. No. 5,698,838.

BACKGROUND OF THE INVENTION

1. Field of the Invention

The present invention relates to a non-contact type IC card using an electromagnetic wave as a communication medium, and a non-contact type IC card system employing this non-contact type IC card.

2. Description of the Related Art

FIG. 43 shows a general arrangement of a known non-contact type IC card system including a non-contact type IC card where an electromagnetic wave is employed as a communication medium. In the illustration, the IC card system comprises a non-contact type IC card (which will hereinafter be referred to as a card) 1, a reader/writer (abbreviated as R/W) unit 2, and a host computer 3 being in connection with the R/W unit 2. That is, the non-contact type IC card employed system usually comprises the card 1, the R/W unit 2 operative to read and write data from and to the card, and the host computer 3 responsible for control of the whole system. Both the R/W unit 2 and host computer 3 can be constructed as one unit (R/W unit). The transmission and reception of the data between the card 1 and the R/W 2 are made using an electromagnetic wave as a medium.

However, such a prior non-contact type IC card system thus arranged does not produce satisfactory results for meeting requirements: (1) a batteryless card not requiring a built-in battery is necessary with a view to reducing its manufacturing cost, being released from the battery life, and coping with serious environmental problems; (2) depending upon the application fields, the received signal level will vary in accordance with the communication distance, i.e., the distance between the card and the R/W unit, whereupon the reception level is required to be adjustable at the card side; (3) in addition to effective power transmission and reception, the reduction of power consumption (demand) to the utmost is necessary for realizing long-distance communications with a batteryless card; (4) for communications from the R/W unit to the card, data transmission will be made simultaneously with power supply, while phase modulation or frequency modulation is needed because continuous power supply is impossible in amplitude modulation, and at this time demodulation with less current consumption needs to be carried out at reception in the card side; and (5) upon the reception of the transmitted data in the R/W unit side, the power transmission to the card side can once be stopped, for which reason the card needs to effectively operate only on the energy accumulated at power supply for the transmission of a necessary amount of data and, hence, to effectively execute the modulation.

SUMMARY OF THE INVENTION

The present invention has been developed in order to meet the above requirements, and it is particularly an object of this invention to provide a non-contact type IC card and a non-contact type IC card system, both being capable of switching the sensitivity of an antenna in accordance with the levels of received signals.

For this purpose, in accordance with one aspect of this invention, a non-contact type IC card, using an electromagnetic wave as a communication medium and not containing a battery therein, is provided, as comprising reception level detecting means connected with an antenna resonance circuit for data transmission and reception for detection of a received signal level and quality factor regulating means also connected with the antenna resonance circuit for altering or changing a quality factor Q of the antenna resonance circuit as a function of the level detected with the reception level detecting means. This arrangement consequently changes the quality factor Q of the antenna resonance circuit on the basis of the received signal level in the antenna resonance circuit. Thus, this arrangement can provide a non-contact type IC card in which the voltage induced goes stable over the wide range of change in the distance from a reading and writing unit.

Another aspect of this invention is that a non-contact type IC card, using an electromagnetic wave as a communication medium and not containing a battery therein, comprises phase detecting means for detecting a phase of a free oscillation of an antenna resonance circuit for data transmission and reception, and energy supply means for supplying, at transmission, an energy from an energy storage circuit to the antenna resonance circuit in phase with the free oscillation of the antenna resonance circuit. That is, energy is supplemented from the energy storage circuit to the antenna resonance circuit at transmission in phase with the detected free oscillation of the antenna resonance circuit. This arrangement can effectively maintain the free oscillation to ensure a long-time transmission.

A further aspect of this invention is that a non-contact type IC card, using an electromagnetic wave as a communication medium and not containing a battery therein, comprises phase detecting means for detecting a phase of a free oscillation of an antenna resonance circuit for data transmission and reception, and resonance frequency switching means for connecting and disconnecting a capacitor to and from the antenna resonance circuit in accordance with one of output data and variation of the output data and an output of the phase detecting means to alter a resonance frequency of the antenna resonance circuit, wherein data transmission is made on the basis of one of frequency modulation and phase modulation. Thus, either connection or disconnection of the capacitor to and from the antenna resonance circuit is made as a function of either the output data or the variation of the output data so that the circuit constant of the antenna resonance circuit, i.e., the resonance frequency, varies, and the data transmission is effected on either the frequency modulation or phase modulation. This arrangement can effectively carry out the modulation with less energy loss at transmission.

A feature of this invention is that a non-contact type IC card, using an electromagnetic wave as a communication medium and not containing a battery therein, includes an antenna resonance circuit for data transmission and reception made up of a series resonance circuit. Because the the antenna resonance circuit is constructed with the series resonance circuit having a low resonance impedance, effective power reception becomes possible.

Another feature of this invention is that a non-contact type IC card, using an electromagnetic wave as a communication medium and not containing a battery therein, is composed of phase variation detecting means for detecting a phase variation of a voltage of an antenna resonance circuit for data transmission and reception due to a received signal on the basis of an amplitude variation thereof, and demodulating means for demodulating data in accordance with the phase variation detected with the phase variation detecting means.

In accordance with this feature of this invention, a phase modulation is employed for the data modulation, while the phase variation of the antenna resonance circuit attributed to the received signal is detected on the basis of its amplitude variation so that the data demodulation is accomplished in accordance with the phase variation detected. Accordingly, the transmission from the reading and writing unit to the card can be made by the phase modulation which allows both the power supply and the data transmission to be comparable, besides the operational energy is savable, for that in the card side the demodulation of the phase variation is effected in accordance with the amplitude variation.

A further feature of this invention is that a non-contact type IC card, using an electromagnetic wave as a communication medium and not containing a battery therein, includes switching means for short-circuiting both terminals of an antenna resonance circuit, made up of a series resonance circuit for data transmission and reception, in accordance with output data, whereby the transmission is made on the basis of a variation of a load of the antenna resonance circuit ascribed to the switching means. That is, the short-circuit between both the terminals of the antenna resonance circuit is produced in accordance with the output data, and the transmission is established on the basis of the resultant load variation of the antenna resonance circuit. This arrangement can provide a non-contact type IC card capable of effectively performing the modulation with loss energy loss at transmission.

In addition, in accordance with an aspect of this invention, there is provided a non-contact type IC card system comprising a non-contact type IC card using an electromagnetic wave as a communication medium and not containing a battery therein, and a reading and writing unit, the non-contact type IC card including switching means for short-circuiting both terminals of an antenna resonance circuit, made up of a series resonance circuit for data transmission and reception, in accordance with output data so that the transmission is made on the basis of a variation of a load of the antenna resonance circuit ascribed to the switching means, whereas the reading and writing unit including demodulating means for carrying out demodulation by detecting a variation of a card side load on the basis of a variation developed in a power transmission adjustment resistor connected with the antenna resonance circuit. In the card side both the terminals of the antenna resonance circuit is short-circuited in accordance with the output data so that the transmission is accomplished on the basis of the variation of the load of the antenna resonance circuit, while in the reading and writing unit side the demodulation is made with the variation of the card side load being detected on the basis of the variation taking place in the power transmission adjustment resistor coming into connection with the antenna resonance circuit. This arrangement can provide a non-contact type IC card system which can effectively carry out the modulation with less energy loss.

Furthermore, in a non-contact type IC card system comprising a non-contact type IC card using an electromagnetic wave as a communication medium and not containing a battery therein, and a reading and writing unit, the reading and writing unit includes compulsory phase inverting means connected between both terminals of an antenna resonance circuit for transmission and reception for short-circuiting therebetween in a range of ±90° relative to a variation of data to compulsorily invert a phase of a signal being transmitted. In this arrangement, the compulsory inverting means short-circuits both the terminals of the antenna resonance circuit in the range of ±90° relative to the variation of data to compulsorily invert the transmitted signal phase, with the result that, in the reading and writing unit side, high-speed data modulation is possible even if Q of the antenna resonance circuit is high. In addition, the data transmission speed from the reading and writing unit to the card improves.

Preferably, additionally included is compulsory phase inversion speed adjusting means effective to suppress a rapid variation of a voltage in the antenna resonance circuit at the compulsory phase inversion. This additional provision of the compulsory phase inversion speed adjusting means controls the rapid variation of the voltage of the antenna resonance circuit at the compulsory phase inversion so that the normal transmission is possible even if the card is close to the reading and writing unit so as to lower Q of the antenna resonance circuit. This arrangement can offer a non-contact type IC card system with a high reliability which is capable of normally establishing the communications even if the card approaches the reading and writing unit to lower the Q of the card side antenna resonance circuit.

Moreover, in accordance with an aspect of this invention, a non-contact type IC card, using an electromagnetic wave as a communication medium and not containing a battery therein, is equipped with phase adjusting means for causing a voltage induced due to a received signal in an antenna resonance circuit to be in phase with an oscillation of the resonance circuit. The phase adjusting means compulsorily causes the phase of the voltage induced due to the received signal in the antenna resonance circuit to be coincident with that of the oscillation of the resonance circuit so that, in the card side, quick data demodulation is practicable irrespective of a high Q of the antenna resonance circuit, which consequently improves the data transmission speed from the reading and writing unit to the card side.

Preferably, further included in the non-contact type IC card is phase variation detection inhibiting means which is operative to inhibit a detection of a phase variation for a given period of time after the detection of the phase detection in order to prevent unnecessary data from being again demodulated regardless of a small amplitude because of the phase variation prior to the phase adjustment upon the detection of the phase variation. This phase variation detection inhibiting means can ensure the normal communication even if the card and the reading and writing unit are close to each other even if Q of the antenna resonance circuit is low. That is, this arrangement can present a non-contact type IC card system with a high reliability which is capable of normally establishing the communications even if the card approaches the reading and writing unit to lower the Q of the card side antenna resonance circuit.

A further feature of this invention is that a non-contact type IC card, using an electromagnetic wave as a communication medium and not containing a battery therein, is provided with a rectifying circuit for rectifying a signal from an antenna resonance circuit for data transmission and reception, and switching means operative in accordance with a switching signal so that one of both terminals of the antenna resonance circuit, developing a lower voltage, is grounded and a higher voltage at the other terminal thereof is selected as a signal. This arrangement permits the amplitude of the antenna resonance circuit to turn large, and additionally, makes it easy to process the signal, for that all the derived signals are positive.

Preferably, the foregoing switching means is equipped with a signal generating circuit which generates a switching signal whose output is inverted when the higher-voltage signal of the antenna resonance circuit turns into a negative level. That is, inverting the output the higher-voltage signal turns into a negative level autonomically allows the lower voltage to be grounded and permits the higher voltage to be taken out as a signal.

Further included in the aforementioned non-contact type IC card are a PLL operative to receive, or input, a signal representative of a received signal turning into a negative state and to produce an output tuned to the inputted signal, and detecting means operative to sample, for demodulation, the switching signal on the basis of the output of the PLL in response to reception of a phase modulation signal every half a period. That is, the PLL operate to take in the signal indicative of the negative received signal and to generate the output tuned thereto, while the demodulation is accomplished with the switching signal at the time of the reception of the phase modulation signal being sampled every half a period on the basis of the output of the PLL, with the result that the detection becomes resistive to the variation of the received voltage of the card.

In the above non-contact type IC card, the inversion of the aforementioned switching signal is implemented every given number of zero cross points of a waveform of the antenna resonance circuit so as to produce a transmission frequency different from the power frequency so that the transmission is practicable in a state with the reception of the power. In addition, the inversion of the aforesaid switching signal is executed every other zero cross point of a waveform in the antenna resonance circuit, and at the time of the modulation the inversion of the aforesaid switching signal is performed every four zero cross points of the waveform in the antenna resonance circuit. Accordingly, the carrier whose frequency is ½ of the power frequency can be generated simultaneously with power reception and then phase-modulated. Moreover, the inversion of the aforesaid switching signal is performed every zero cross point through every four zero cross points of a waveform in the antenna resonance circuit at the time of the modulation, which permits the phase modulation on the basis of four kinds of phases. With this arrangement, the data transmission becomes possible at a higher speed because of an increase in transmission information amount per data.

A still further feature of this invention is that the aforementioned non-contact type IC card includes a PLL operative to receive a signal representative of a received signal turning into a negative state and to produce an output tuned to the inputted signal, wherein, for the phase modulation, half the period is obtained from the output of the PLL and both terminals of the aforesaid antenna resonance circuit are short-circuited for half the period from a zero cross point at modulation. This arrangement can realize a high-speed demodulation without requiring a capacitor. Similarly, for the phase demodulation, half the period is obtained from the output of the PLL and both terminals of the aforesaid antenna resonance circuit are short-circuited for half the period from a zero cross point at modulation. This arrangement can also realize a high-speed demodulation without requiring a capacitor.

Moreover, in accordance with an aspect of this invention, the capacitor noted above is connected with the antenna resonance circuit during one period and disconnected therewith during two periods, and the transmission frequency, being ½ of (half) the power frequency, is produced to carry our the transmission in a state with the reception of the power. In contrast to this, at the time of the modulation, the phase modulation is performed in such a way that the capacitor is disconnected therewith during one period. This arrangement permits the generation of the transmission carrier in a state with the reception of the power and the transmission based on the phase modulation.

BRIEF DESCRIPTION OF THE DRAWINGS

The object and features of the present invention will become more readily apparent from the following detailed description of the preferred embodiments taken in conjunction with the accompanying drawings in which:

FIG. 34 is an illustration of one example of a circuit arrangement of a non-contact type IC card according to a seventeenth embodiment of this invention;

FIG. 35 is an illustration of waveforms in the FIG. 34 circuit;

FIGS. 36A and 36B are illustrations of one example of a circuit arrangement of a non-contact type IC card according to an eighteenth embodiment of this invention;

FIG. 37 is an illustration of waveforms in the FIG. 36 circuit;

FIGS. 40A to 40C are illustrations of waveforms in a card side and a reading and writing unit side in the nineteenth embodiments, which are obtained through computer simulation analysis;

DESCRIPTION OF THE PREFERRED EMBODIMENTS

Figure 1:
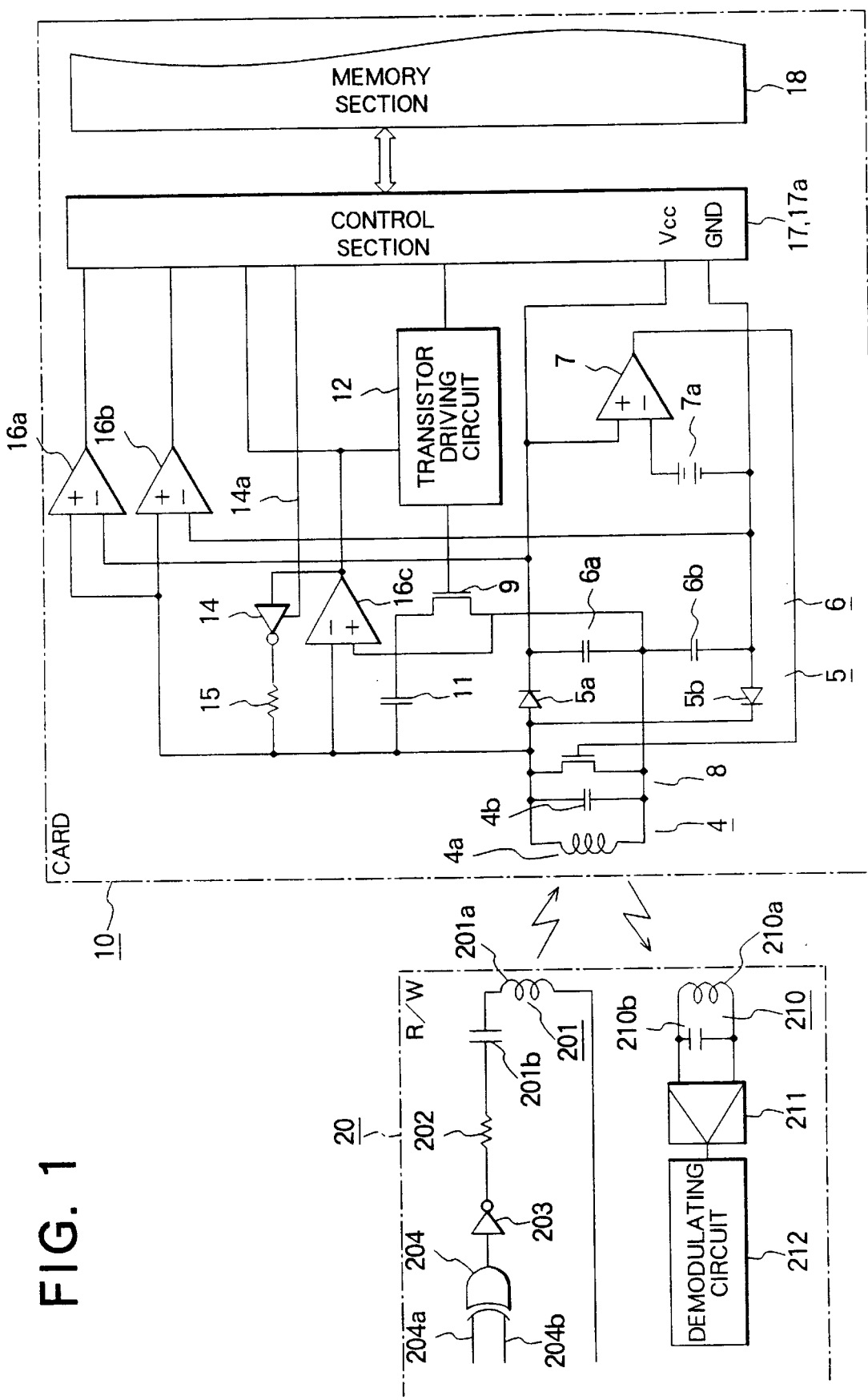
FIG. 1 is a circuit diagram showing an arrangement of a non-contact type IC card system according to first to third embodiments of the present invention.

Referring now to FIG. 1, a description will be made hereinbelow of a non-contact type IC card system according to a first embodiment of the present invention. In the illustration, the non-contact type IC card system, generally designated at reference numeral 100, basically comprises a batteryless non-contact type IC card (which will be referred hereinafter to as a card) 10 and a reading and writing unit (hereinafter to as a R/W unit) 20. The card 10 includes an antenna resonance circuit 4 being a parallel resonance circuit made up of an antenna coil 4a and a capacitor 4b, and further includes a rectifier circuit 5 made up of rectifying devices 5a, 5b, and an energy storage circuit 6 composed of energy storage capacitors 6a, 6b. Incidentally, FIG. 1 shows an arrangement of a full-wave voltage doubler rectifier. Further included in the card 10 are a comparator 7 coupled to a reference power source 7a for detection of the fact that the rectified voltage exceeds a predetermined value and a variable resistance device 8 composed of such an element as a MOSFET transistor connected in parallel to the antenna resonance circuit 4. When the comparator 7 detects the rectified voltage exceeding the predetermined value, the variable resistance device 8 alters, or changes, the quality factor Q of the antenna resonance circuit 4 in accordance with the amount over (the difference from) the predetermined value. Also included therein are an output transistor 9, an output capacitor 11, a transistor driving circuit 12, a driver 14 getting into an actuated state in response to a control signal 14a at transmission, and a resistor 15 connected with the output side of this driver 14.

In addition, the card 10 is provided with a high-potential side level comparator 16a operative to detect that the amplitude level in the high-potential side of the antenna resonance circuit 4 exceeds a predetermined value (for example, Vcc), a low-potential side level comparator 16b responsible for detecting that the amplitude level in the low-potential side of the antenna resonance circuit 4 becomes below a predetermined value (for example, GND), a mid-level comparator 16c taking charge of detecting whether the level in the antenna resonance circuit 4 is higher or lower than a predetermined value (for example, ½ of Vcc), and further provided with a control section 177 and a memory section 18 for the storage of data. Incidentally, the memory section 18 may be constructed with an EEPROM or the like not requiring a backup because the card 10 is of the batteryless type.

On the other hand, the R/W unit 20 is provided with an antenna resonance circuit 201 for transmission composed of an antenna coil 201a and a capacitor 201b constituting a serial resonance circuit, a power transmission adjusting resistor 202 for adjusting the magnitude of the power transmission from the R/W unit 20, a driver 203, and a modulating circuit 204 composed of an EX-OR circuit and coming into connection with an input side of the driver 203. The modulating circuit 204 is responsive to data 204a and a carrier 204b. In addition, the R/W unit 20 is equipped with an antenna resonance circuit 210 for reception made up of an antenna coil 210a and a capacitor 210b organizing a parallel resonance circuit, an amplifying circuit 211 for amplifying a signal received, and a demodulating circuit 212.

Embodiment 1

Since the power supply greatly varies with the distance between the R/W unit 20 and the card 10, in the card 10 side the change of the quality factor Q is made on the basis of the rectified voltage to stabilize the voltage induced in the card 10, thus causing the absorption of the variation of the power supply. In the FIG. 1 arrangement, the comparator 7 and the reference power source 7a make up the reception level detecting means, and the variable resistance device 8 constitutes the quality factor adjusting means.

In operation, in a case where the comparator 7 detects the fact that the rectified voltage exceeds a predetermined value, the variable resistance device 8 is adjusted so that the quality factor Q of the antenna resonance circuit 4 becomes lower as a function of the difference from the predetermined value. The reduction of the quality factor Q makes the received voltage adjustable, whereupon the voltage induced in the card 10 is made stable against the variation of the distance between the R/W unit 20 and the card 10.

Embodiment 2

In addition, a description will be taken of a second embodiment of this invention in conjunction with FIG. 1. One aspect of the second embodiment is as follows. That is, the data transmission from the card 10 to the R/W unit 20 is carried out in a state where the transmission from the R/W unit 20, requiring a large transmission power, stops, whereas in this case the power supply stops and, hence, effective use of the energy stored in the card 10 is necessary. To this end, in this embodiment the energy stored in the energy storage capacitors 6a, 6b is made to be gradually supplied to the antenna resonance circuit 4 of the card 10 by means of direct utilization of the free oscillation taking place in the antenna resonance circuit 4, with the result that the attenuation time of the free oscillation goes long.

In this embodiment, the mid-level comparator 16c makes up the phase detecting means, and the driver 14 and the resistor 15 composes the energy supply means. The driver 14 is composed of a circuit in which a Pch transistor and an Nch transistor are coupled in series between the power source and the reference potential, i.e., between both terminals of the energy storage circuit 6, and is for supplying the energy of the energy storage circuit 6 through the resistor 15 to the antenna resonance circuit 4.

In operation, at transmission the driver 14 turns into the actuating state in response to the control signal 14a. The phase of the antenna resonance circuit 4 is detected on the basis of the output of the mid-level comparator 16, and the energy from the energy storage capacitors 6a, 6b is supplied to the antenna resonance circuit 4 by the amount necessary for maintaining the free oscillation of the antenna resonance circuit 4 in phase with the free oscillation therein. At this time, the adjustment of the supply amount relies upon the resistance of the resistor 15, whereby it is possible to lengthen the transmission time from the card 10.

Embodiment 3

Furthermore, a third embodiment of this invention will be described hereinbelow referring to the FIG. 1 circuit arrangement. Less energy consumption is also necessary in the modulation for the data transmission from the card 10 to the R/W unit 20. Accordingly, in this embodiment, a constant of the antenna resonance circuit 4 is changed in accordance with the variation of data being transmitted, thereby realizing a phase modulation mode.

In this embodiment, the mid-level comparator 16c organizes the phase detecting means, and the output transistor 9, the output capacitor 11 and the transistor driving circuit 12 compose the resonance frequency switching means. The transistor driving circuit 12 is of the type that supplying a signal to the output transistor 9 when pulsed output data of the control section 17 varies.

The operation of this embodiment is as follows. In the case of the phase modulation, the transistor driving circuit 12 generates a 180° pulse arising for the 180° phase period when the output data varies. The 180° phase period is obtainable on the basis of the output of the mid-level comparator 16c. Subsequently, the output transistor 9 turns on and off in accordance with this 180° pulse, with the result that the connection and disconnection of the output capacitor 11 to and from the antenna resonance circuit 4 take place so that the resonance frequency of the antenna resonance circuit 4 varies in accordance with the variation of the data. The connection of the output capacitor 11 to the antenna resonance circuit 4 results in the variation of the circuit constant of the antenna resonance circuit 4.

Figure 2:
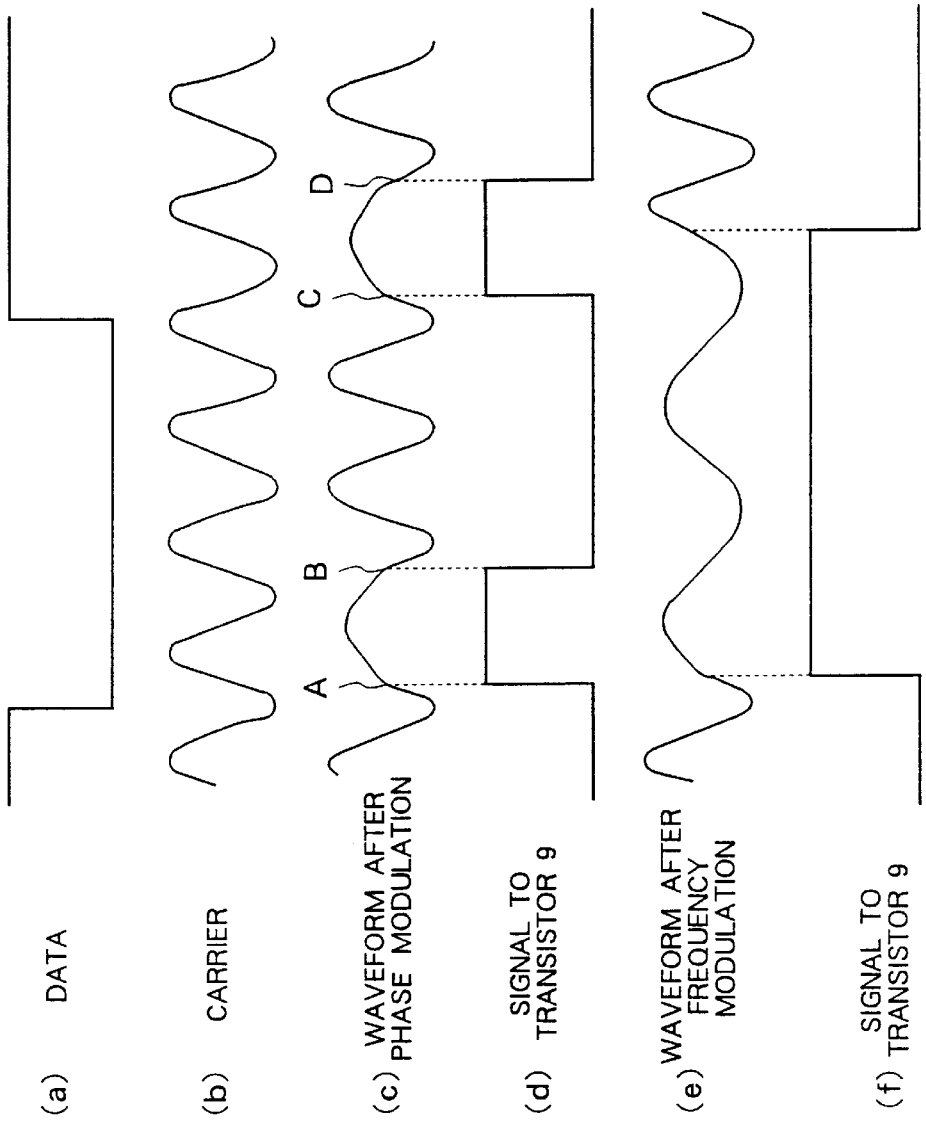
FIG. 2 is a waveform chart useful for describing operations of the FIG. 1 circuit arrangement.

FIG. 2 is a waveform chart useful for describing the operation, where (a) represents data, (b) designates a carrier, (c) denotes a phase-modulated waveform, (d) depicts a signal (180° pulse) supplied to the base of the transistor 9 in phase modulation, (e) indicates a frequency-modulated waveform, and (f) signifies a signal fed to the base of the transistor 9 in frequency modulation. As obvious from (a) to (d) of FIG. 2, when the variation of the output data occurs (from an H level to a L level or vice versa), the frequency varies for the period of 180°. At this time, assuming that the varied frequency is ½ of the original frequency, a two-phase modulation can be realized. That is, as indicated in (c) of FIG. 2, the phase-modulated signal develops the variation in frequency to ½ for the 180° period, i.e., for the period between characters A and B, by which frequency variation the inversion of the phase takes place for the period between characters C and D. On the other hand, if taking the phase into account on the basis of the output of the mid-level comparator 16c the output transistor 9 turns on and off directly in accordance with the variation of the output data from the control section 17, then as shown in (e) and (f) of FIG. 2 the frequency modulation can be realized wherein the frequency is lowered to ½.

These modulation systems require less energy for the modulation in the card 10, for that no modulation is made by driving the antenna resonance circuit.

Figure 3:
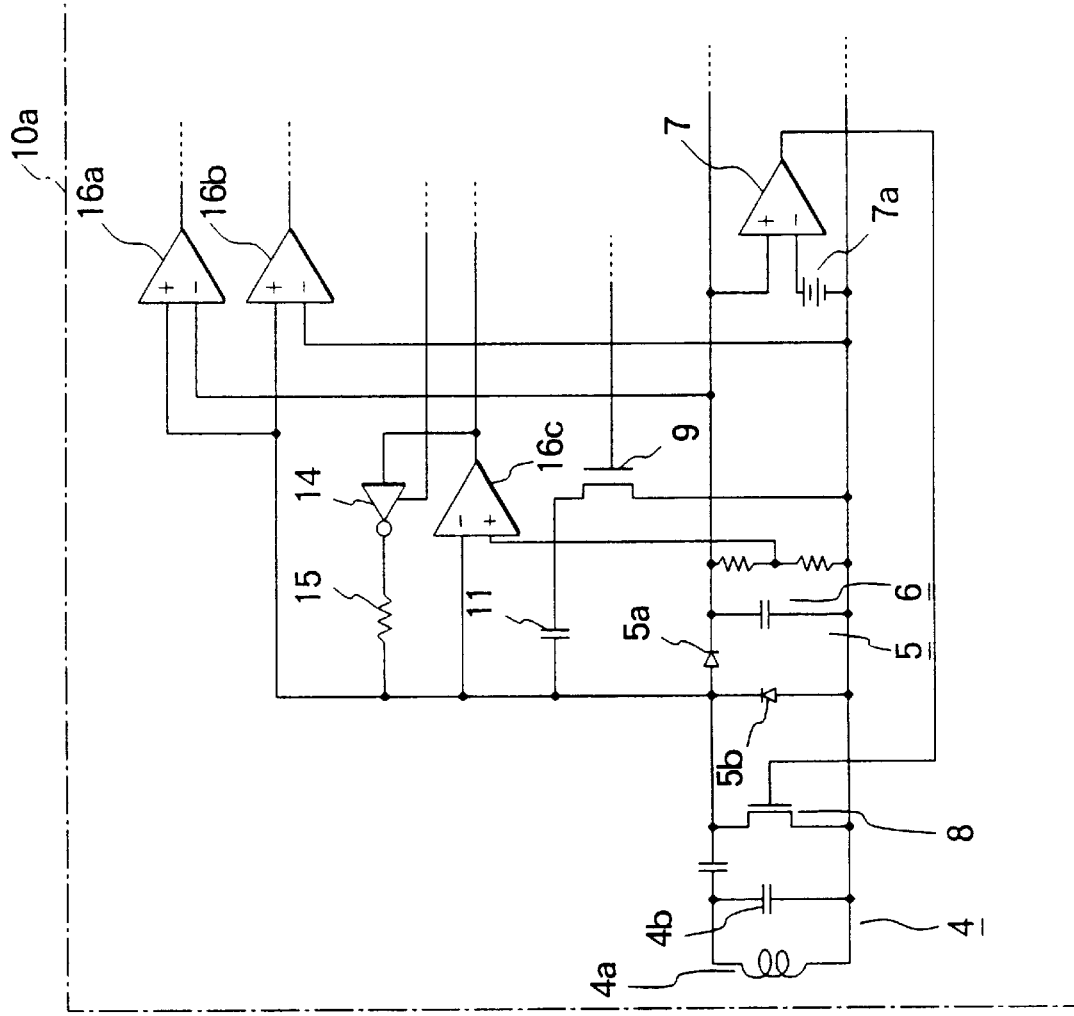
FIG. 3 is a circuit diagram showing another arrangement of a non-contact type IC card.

Although in the FIG. 1 arrangement the section including the rectifying circuit 5 and the energy storage circuit 6 is constructed as a full-wave voltage doubler rectifier, as shown in FIG. 3 this can also be constructed as a half-wave doubler rectifier comprising a rectifying circuit 5 made up of rectifying devices 5a, 5b and an energy storage circuit 6 made up of one capacitor. In addition, other rectifying ways such as a half-wave rectification and a bridge rectification is also practicable.

Figure 4:
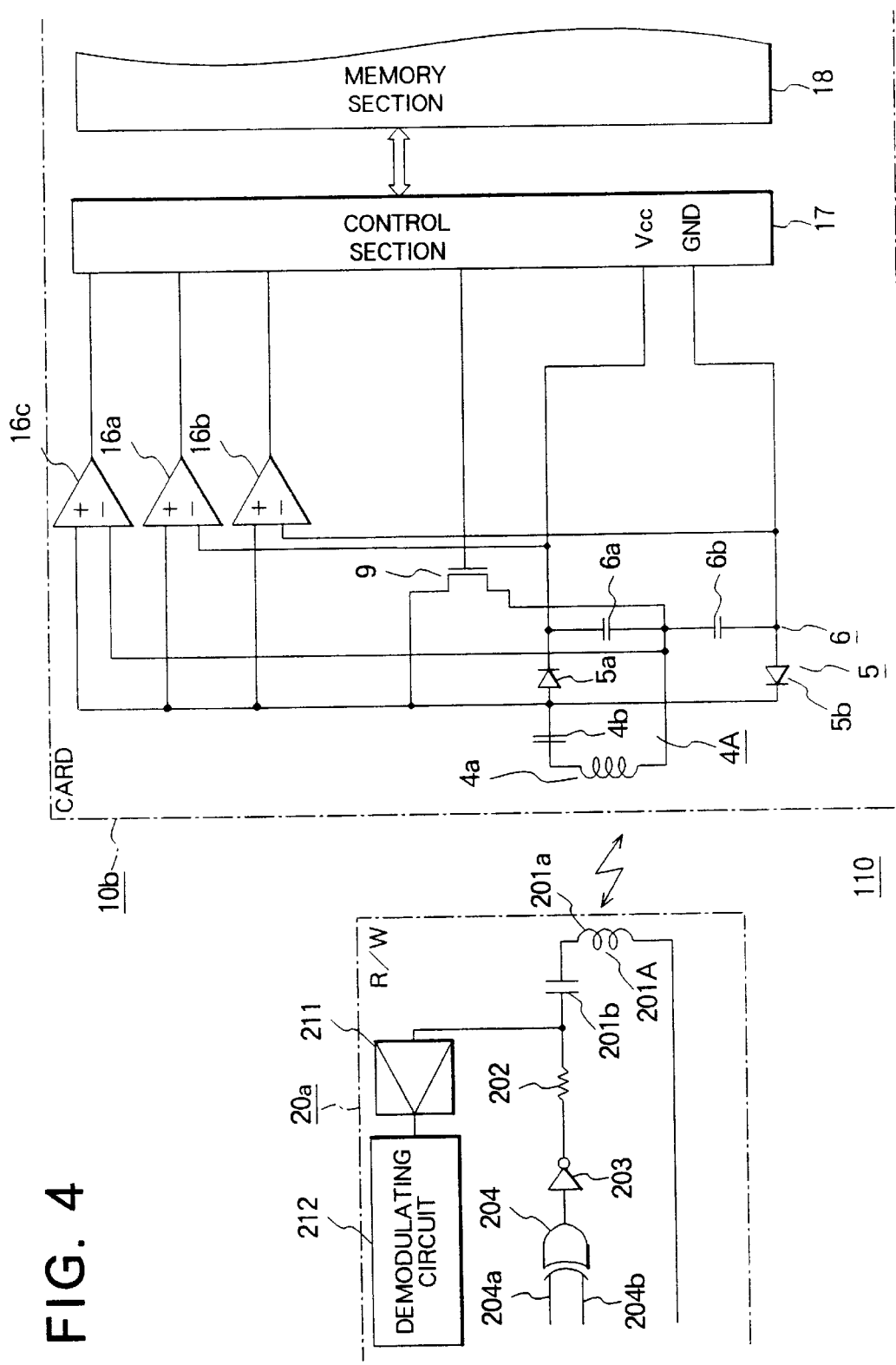
FIG. 4 is a circuit diagram showing another arrangement of a non-contact type IC card system according to fourth to sixth embodiments of the present invention.

FIG. 4 is an illustration of another arrangement of a non-contact type IC card system according to this invention. In the illustration, this card system, generally designated at reference numeral 110, similarly comprises a card 10b and a R/W unit 20b. In the FIG. 4 system, parts corresponding to those in FIG. 1 are marked with the same reference numerals, and the description thereof will be omitted for brevity. Further, in FIG. 4 the portions related to only the foregoing first to third embodiments are omitted. One feature of the R/W unit 20a is to have an antenna resonance circuit 201A for both transmission and reception.

Embodiment 4

Referring to FIG. 4, a description will be made hereinbelow with reference to FIG. 4 in terms of a fourth embodiment of this invention. In a case where the card 10b develops a large current consumption, the effective power transmission from the R/W unit 20a to the card 10b needs a low impedance of the antenna resonance circuit 4A. Accordingly, in this fourth embodiment the antenna resonance circuit 4A of the card 10b is constructed as a series resonance circuit in which an antenna coil 4a and a capacitor 4b are coupled in series to each other so that the power is taken in through the antenna resonance circuit 4A composed of the series resonance circuit with a low resonance impedance. This arrangement allows the effective power reception in the card 10b.

Embodiment 5

Moreover, a fifth embodiment of this invention will be described in conjunction with FIG. 4. That is, in simultaneously transmitting data while supplying the power from the R/W unit 20a to the card 10b, the continuous power supply will be impossible in the amplitude modulation. Whereupon, the phase modulation or frequency modulation results in being necessary. Thus, according to this fifth embodiment, in order for the power supply and data transmission from the R/W unit 20a to the card 10b to be compatible with each other, the data is subjected to the phase modulation and in the card 10b side the phase variation of the signal received with the antenna resonance circuit 4A is detected as a voltage variation, i.e., amplitude variation, with a data demodulation.

In this embodiment, the high-potential side level comparator 16a and the low-potential side level comparator 16b make up the phase variation detecting means, and the mid-level comparator 16c, control section 17 and so on organize the demodulating means.

Figure 5:
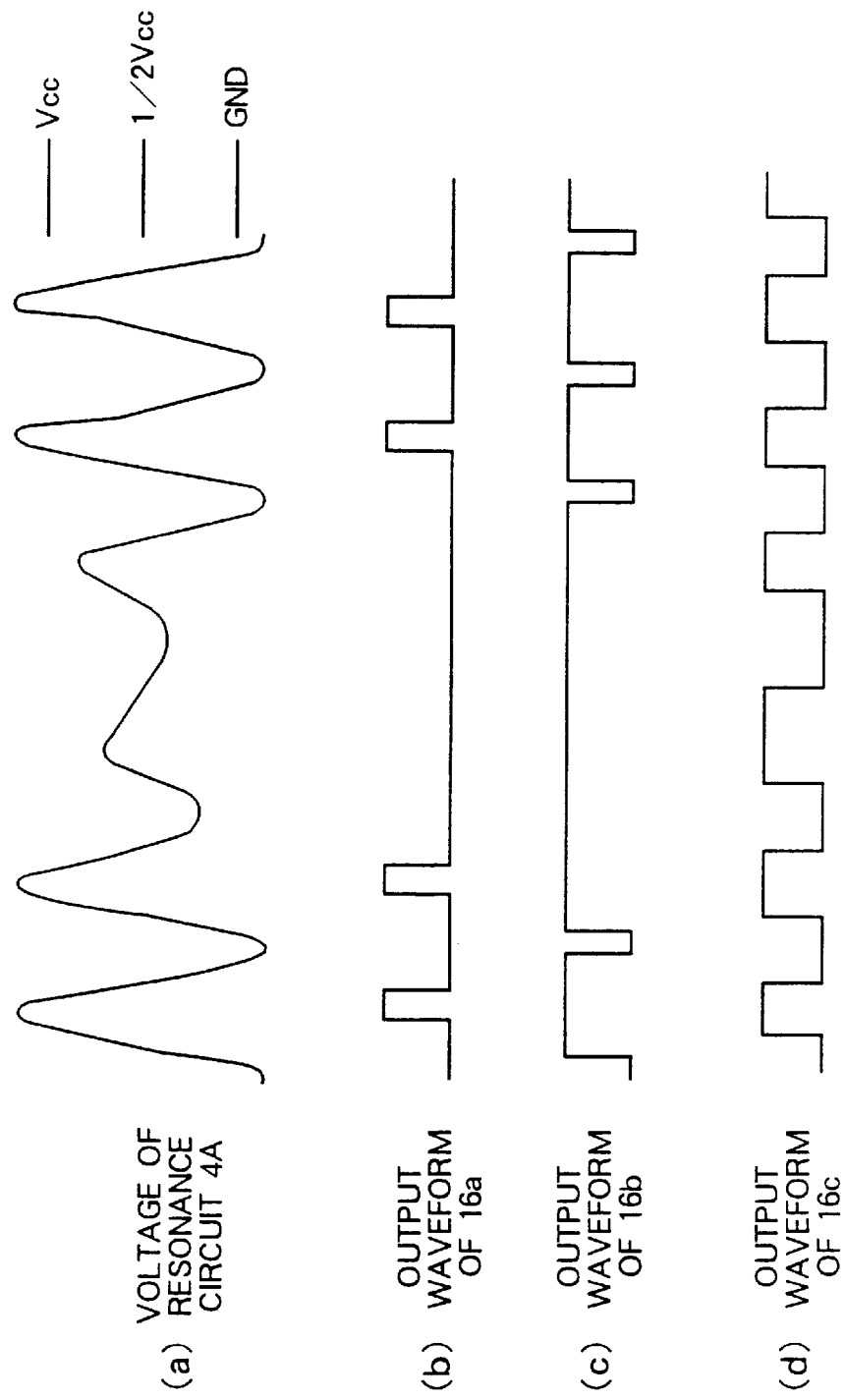
FIG. 5 is a waveform chart useful for describing operations of the FIG. 4 circuit arrangement.

FIG. 5 is a waveform chart available for describing the operations in demodulating the received signal in the card 10b on the condition that the data undergoes the phase modulation. In FIG. 5, (a) represents a waveform in the antenna resonance circuit 4A, (b) designates an output waveform of the high-potential side level comparator 16a, (c) indicates an output waveform of the low-potential side level comparator 16b, and (d) signifies an output waveform of the mid-level comparator 16c.

The demodulation of the received signal in the card 10b is accomplished by detecting the variation of the amplitude of a received signal at the time that the phase of the received signal varies. On the basis of the outputs of the comparators 16a, 16b, a decision is made such that the phase variation comes about when the received signal (amplitude) does not exceed the rectified voltage, with the data demodulation being made in accordance with this decision. Detecting the phase variation from the amplitude variation can reduce the operational current in the card 10b side. Thus, in addition to both the data transmission and power supply being consistent with each other, the operational energy is reducible at demodulation in the card 10b side. Although the above description has been made in terms of the card 10b, the card 10 in FIG. 1 or the like is also practicable.

Embodiment 6

Still further, a description will be made hereinbelow of a sixth embodiment of this invention. Even in the modulation for the data transmission from the card 10b to the R/W unit 20a, less energy consumption is also necessary. Accordingly, in this embodiment the data transmission from the card 10b to the R/W unit 20a is achieved in such a way that both terminals of the antenna resonance circuit 4A constructed as a series resonance circuit in the card 10b, i.e., both ends of the load, are short-circuited in accordance with the data to be transmitted. The output transistor 9 turns on and off in conjunction with the output data from the control section 17.

On the other hand, the data reception in the R/W unit 20a is accomplished in such a manner that the load variation in the card 10b side is detected through an amplifying circuit 211 and a demodulating circuit 212 from both terminals of a power transmission adjusting resistor 202 operative to adjust the degree of power transmission from the R/W unit 20a. Similarly, since this modulation system does not depend upon the driving of the antenna resonance circuit 4A, the modulation can be accomplished with less energy in the card 10b.

In this embodiment, the output transistor 9 in the card 10b side constitutes the switching means, and the power transmission adjusting resistor 202, the amplifying circuit 211 and the demodulating circuit 212 in the R/W unit 20a side compose the demodulating means.

Figure 6:
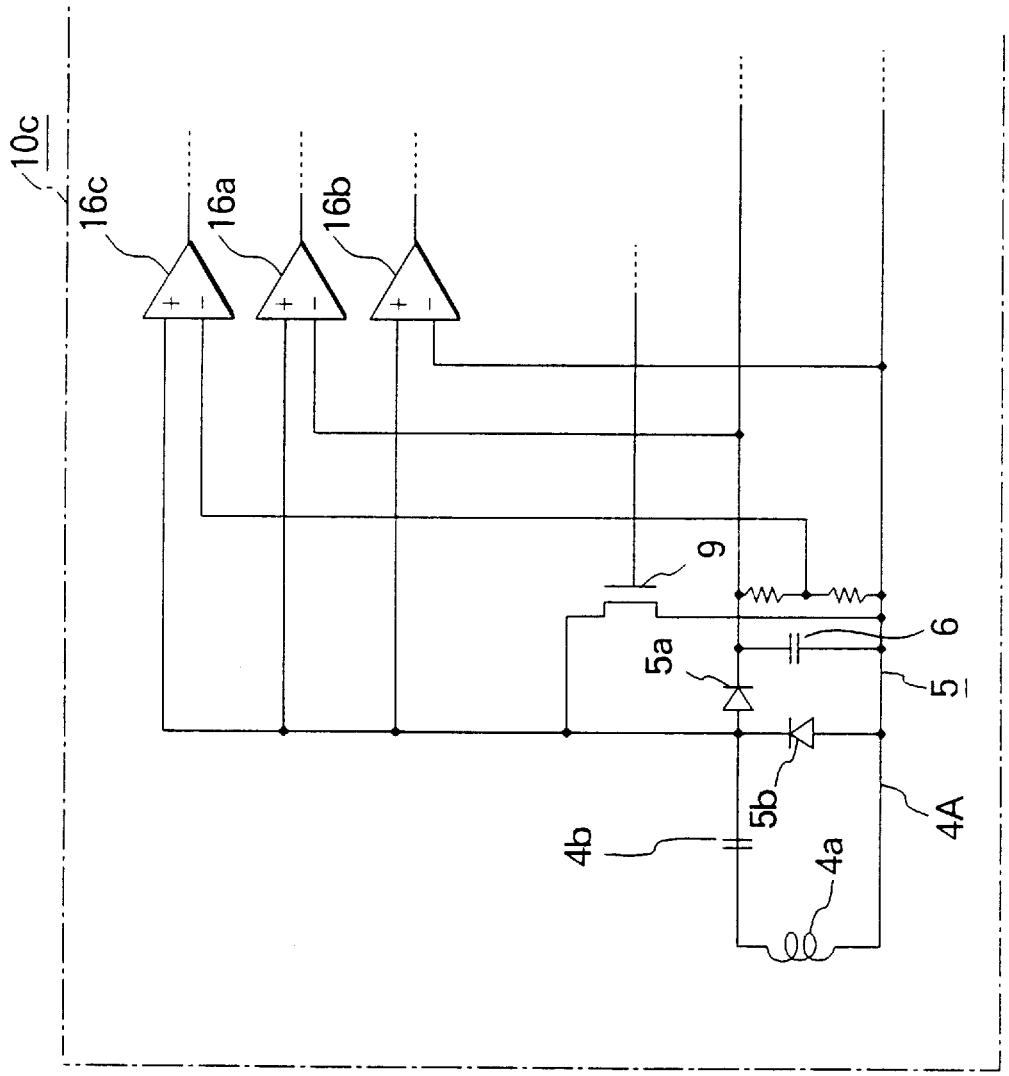
FIG. 6 is a circuit diagram showing another arrangement of a non-contact type IC card.

Although in the FIG. 4 arrangement the section including the rectifying circuit 5 and the energy storage circuit 6 is constructed as a full-wave voltage doubler rectifier, as shown in FIG. 6 this can also be constructed as a half-wave doubler rectifier comprising a rectifying circuit 5 made up of rectifying devices 5a, 5b and an energy storage circuit 6 made up of one capacitor. In addition, other rectifying ways such as a half-wave rectification and a bridge rectification is also practicable.

Embodiment 7

A description will be taken hereinbelow of a seventh embodiment of this invention. In the non-contact type IC card system based on the phase modulation as in the foregoing embodiments, as the drive resistance of the transmission antenna resonance circuit (see 201 in FIG. 1) of the R/W unit made as a series resonance circuit is set to be lower and the quality factor Q thereof is set to be higher, the voltage across the antenna resonance circuit goes larger, which can transmit the power to a distance. On the contrary, this system suffers from a disadvantage with regard to the data transmission speed from the R/W unit to the card. That is, while the signal is modulated in the R/W unit side, as the Q is higher, the time required for the modulation becomes longer, with the result that the data transmission speed becomes lower. In other words, the transmission speed becomes lower with an increase in communication distance.

Figure 7:
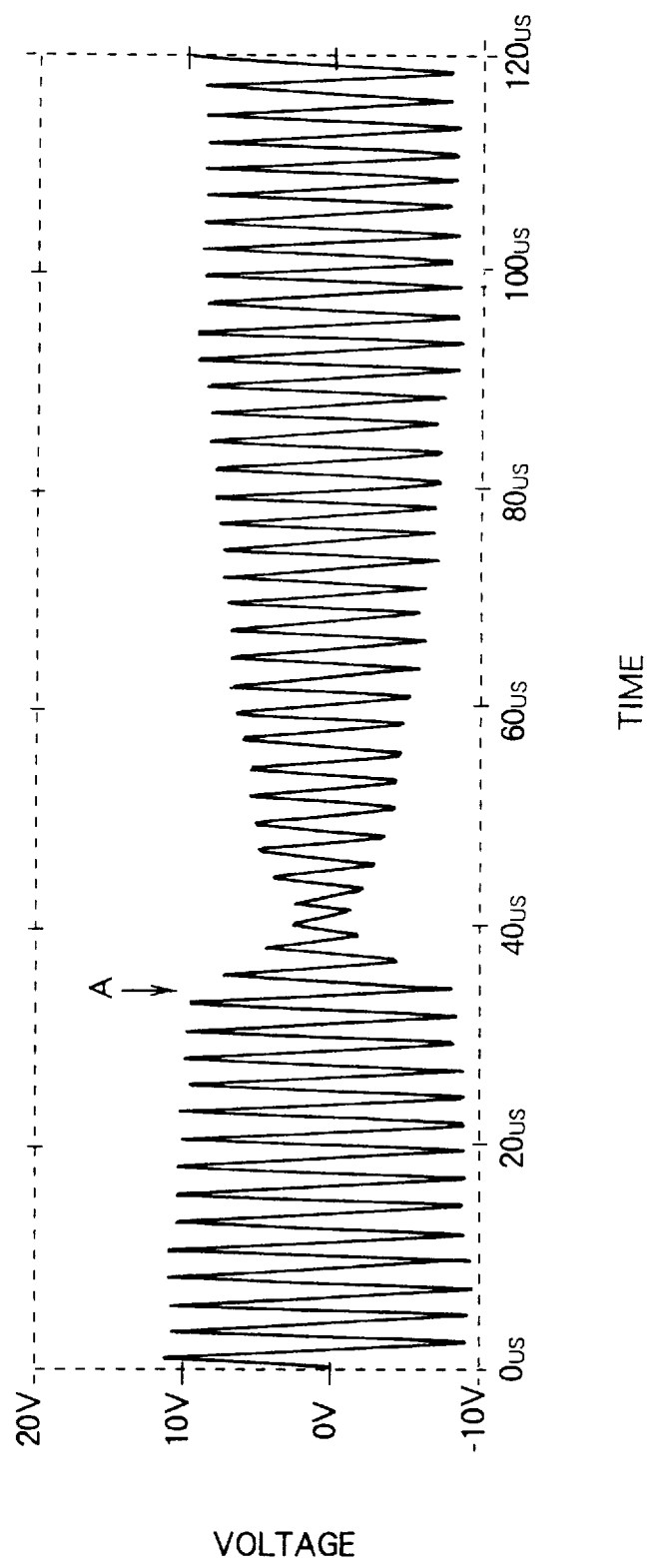
FIG. 7 is an explanatory illustration available for the delay of data transmission in a seventh embodiment of this invention.

FIG. 7 shows a waveform of a transmitted signal in a case where the transmission antenna resonance circuit of the R/W unit has a high Q. This transmitted signal shows a turning point of data at a position A, while the high Q delays the variation of the voltage in the antenna resonance circuit for the transmission and reception. Accordingly, this seventh embodiment is designed such that, even if the transmission and reception antenna resonance circuit in the R/W unit side retains a high Q, the data modulation is possible at a high speed so as to permit a high-speed data transmission.

Figure 8:
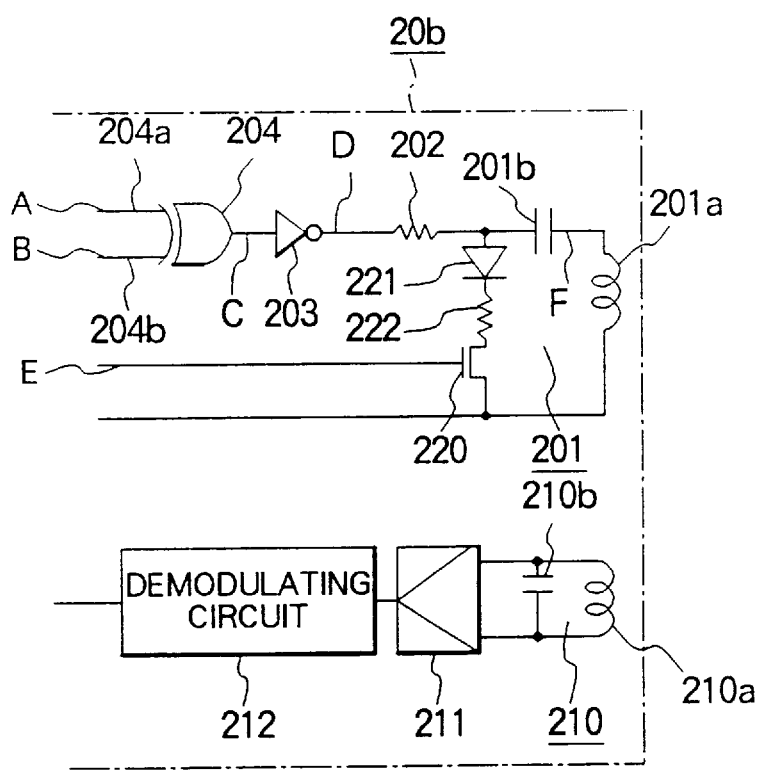
FIG. 8 is an illustration of a circuit arrangement of a reading and writing unit of a non-contact type IC card system according to this invention.

FIG. 8 illustrates an arrangement of a R/W unit 20b in this embodiment and an eighth embodiment of this invention which will be described later. This R/W unit 20b is connected in parallel to a transmission antenna resonance circuit 201, and further coupled to a short-circuiting transistor 220 for short-circuiting both terminals of the resonance circuit 201 and to a diode 221 for avoiding the reverse flow of a current. Incidentally, a resistor 222 is for the eight embodiment which will be described later and does not need to be used in this embodiment. The short-circuiting transistor 220 and the diode 221 compose the compulsory phase inverting means.

Figure 9:
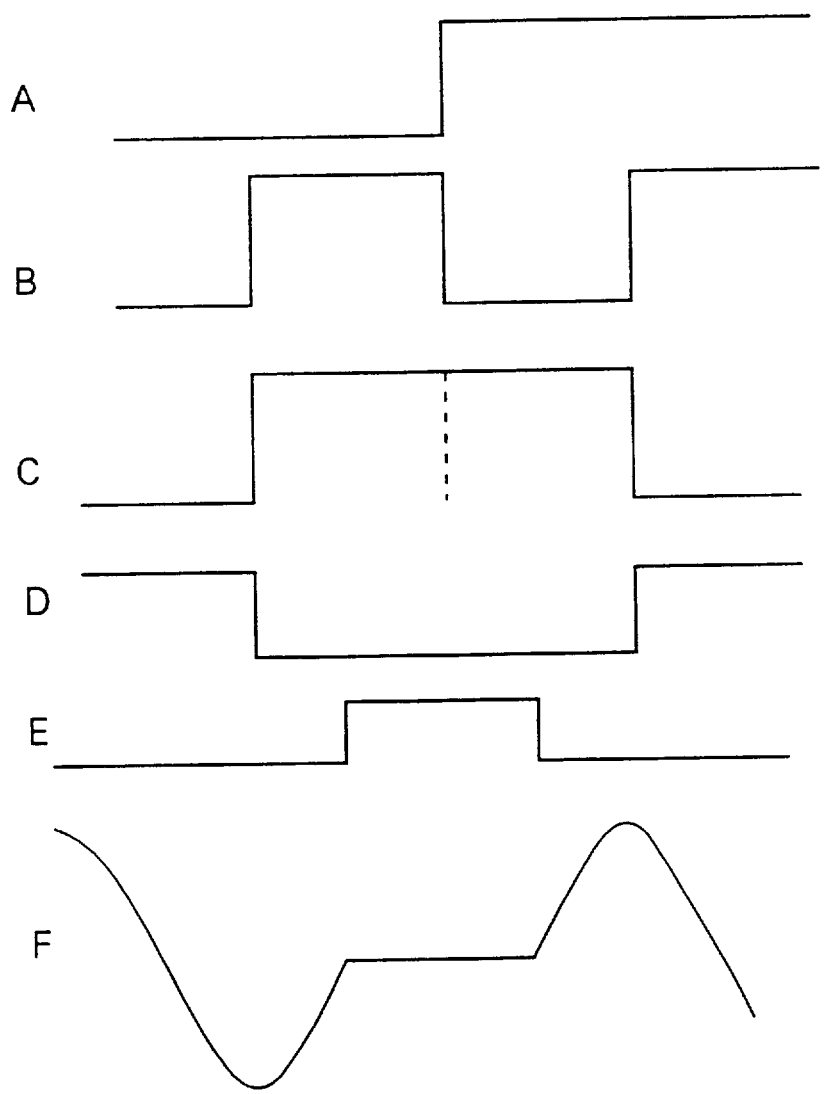
FIG. 9 is a waveform chart useful for describing operations of the FIG. 8 reading and writing unit.
Figure 10:
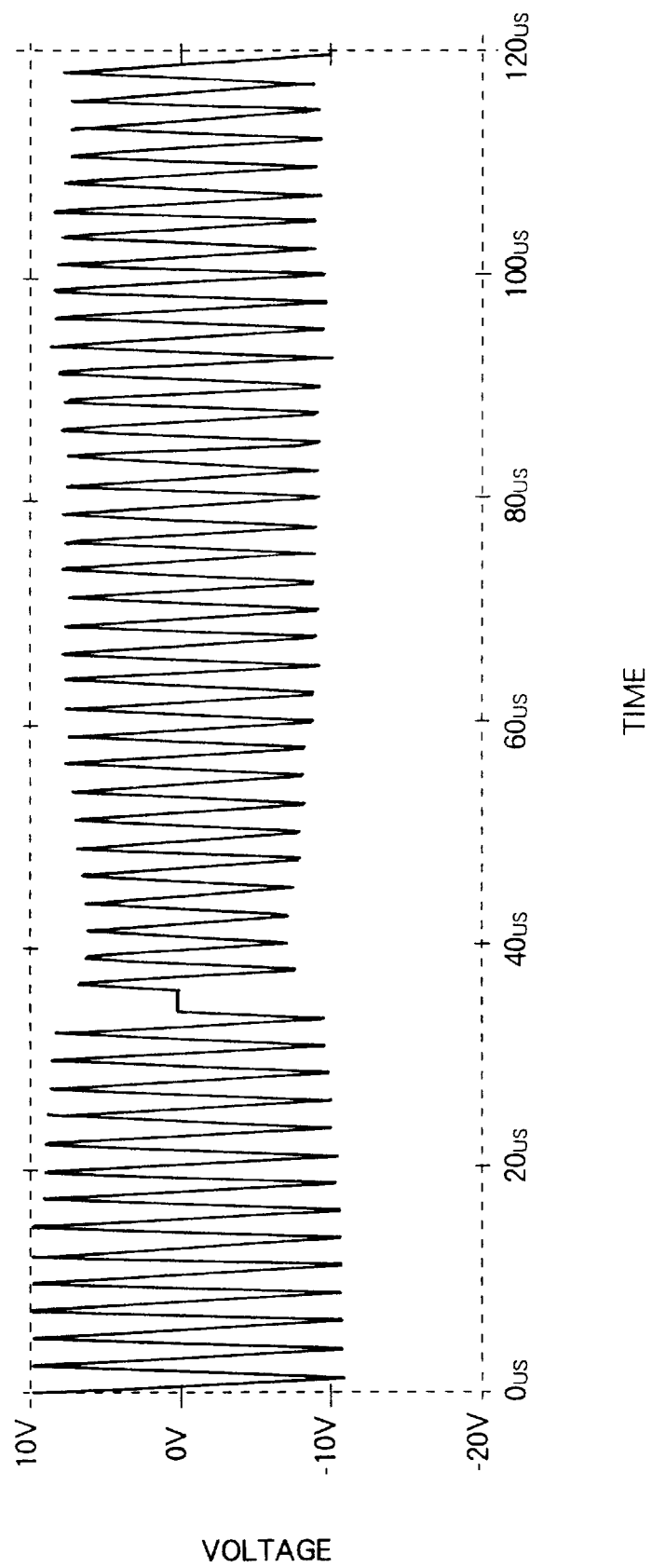
FIG. 10 is a waveform chart useful for describing a phase modulation in the FIG. 8 reading and writing unit.

The operation of the R/W unit 20*b* at transmission will be described hereinbelow with reference to FIG. 8 and FIG. 9 showing waveforms in the FIG. 8 circuit arrangement. In FIGS. 8 and 9, a carrier B is phase-modulated with the original data A to make a data C. A data D outputted from a driver 203 comes into an inverted state. A signal E, responsible for short-circuit between both terminals of the resonance circuit 201 in the range of ±90° with respect to the variation of the data D, is applied to the short-circuiting transistor 220. At this time, the voltage of the resonance circuit 201 alters as indicated by F. More specifically, as shown by F of FIG. 9, both the terminals of the resonance circuit 201 is short-circuited during 180° after the voltage of the resonance circuit 201 reaches zero. The short-circuiting transistor 220 serves as the element for the short-circuiting, while the diode 221 is of the reverse-flow preventing type that inhibits the flow of current into the short-circuiting transistor 220 when F in FIG. 9 shifts to the negative side. Thus, the R/W unit 20*b* produces the phase modulation without the delay of rising of the voltage as shown in FIG. 10, and even if the Q of the R/W unit side transmission and reception antenna resonance circuit is high, the data transmission from the R/W unit to the card is possible at a high speed.

Embodiment 8

Figures 11A, 11B:
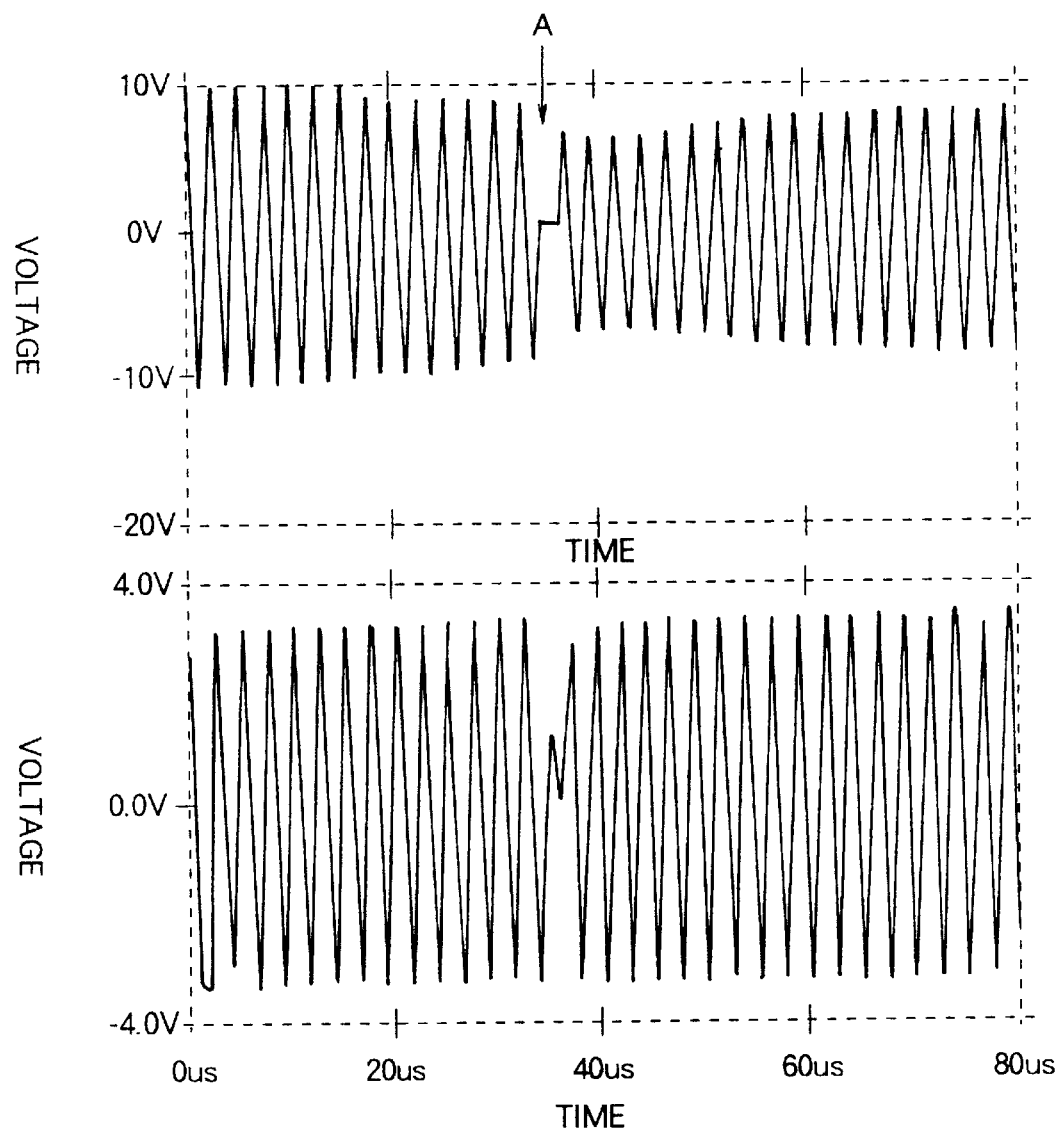
FIGS. 11A and 11B are waveform charts useful for describing a receiving state in a card on phase modulation according to the seventh embodiment in a case where the Q of a resonance circuit is low.

Moreover, a description will be made hereinbelow of an eighth embodiment of this invention. Although in the foregoing first embodiment the approach of the card to the R/W unit results in lowering the Q in order to prevent excessive increase in voltage, if the Q lowers on and on, then the delay from the waveform in the R/W unit antenna resonance circuit becomes small, with the result that the waveform in the card antenna resonance circuit approaches the waveform in the R/W unit antenna resonance circuit. If in this state the phase is compulsorily inverted as indicated by A of FIG. 11A as in the seventh embodiment, the card side develops a received signal as shown in FIG. 11B where the decrease in amplitude momentarily takes place so that difficulty is encountered in the detection of the turning point, thus making the demodulation impossible. For this reason, the eight embodiment of this invention provides an arrangement to allow the data reception irrespective of the approach of the card to the R/W unit. One feature of this embodiment is that a resistor 222, acting as compulsory phase inversion speed adjusting means, is placed in series to the short-circuiting transistor 220 in the R/W unit 20*b* of FIG. 8.

Figures 12A, 12B:
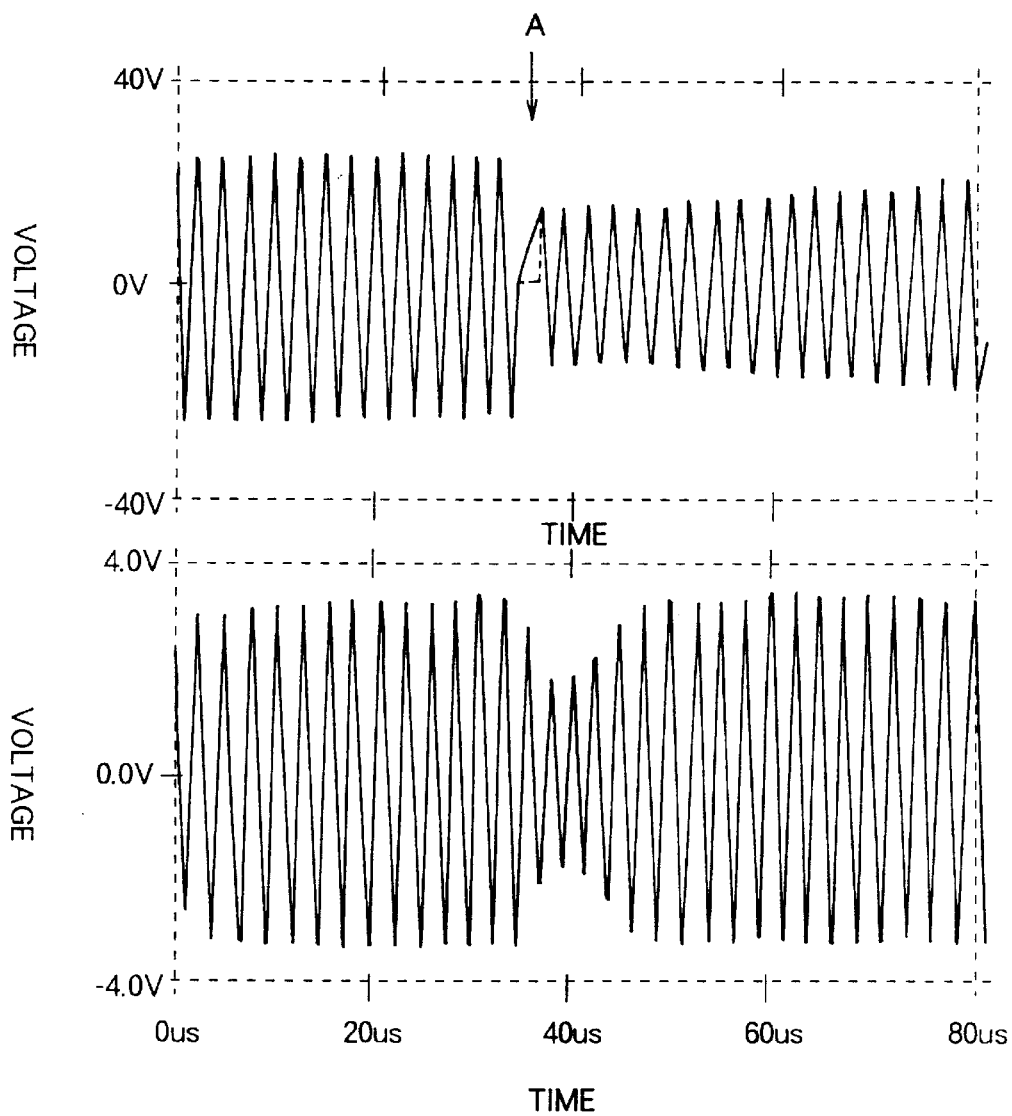
FIGS. 12A and 12B are waveform charts available for explanation of a transmission state in a reading and writing unit according to an eighth embodiment of this invention.

Secondly, the operation of this embodiment is as follows. When the R/W unit 20*b* carries out the data modulation at a high speed, the amplitude of its waveform is made to be lowered up to a level which will make its modulation possible in the card (see 10 in FIG. 1) side. For this purpose, the resistor 222 is added in series to the short-circuiting transistor 220 to create a loss to decrease the amplitude in the transmission antenna resonance circuit 201. As a result, the waveform of the signal being transmitted from the R/W unit 20*b* slowly varies as shown in FIG. 12A, whereas the detection of the turning point can accurately be made in the card side as shown in FIG. 12B. Accordingly, adequate control of the loss (compulsory phase inversion) at modulation in the R/W unit side permits both the high-speed data transmission and short-distance communication to be comparable in transmission to the card side.

Embodiment 9

Still further, a description will be made hereinbelow in terms of a ninth embodiment of this invention. Although the foregoing seventh embodiment relates to the increase in data transmission speed from the R/W unit side to the card side and more particularly to the modulation in the R/W unit side, this ninth embodiment is similarly concerned with the data transmission speed and particularly with demodulation at the time of the card side receiving data from the R/W unit side.

Figure 13:
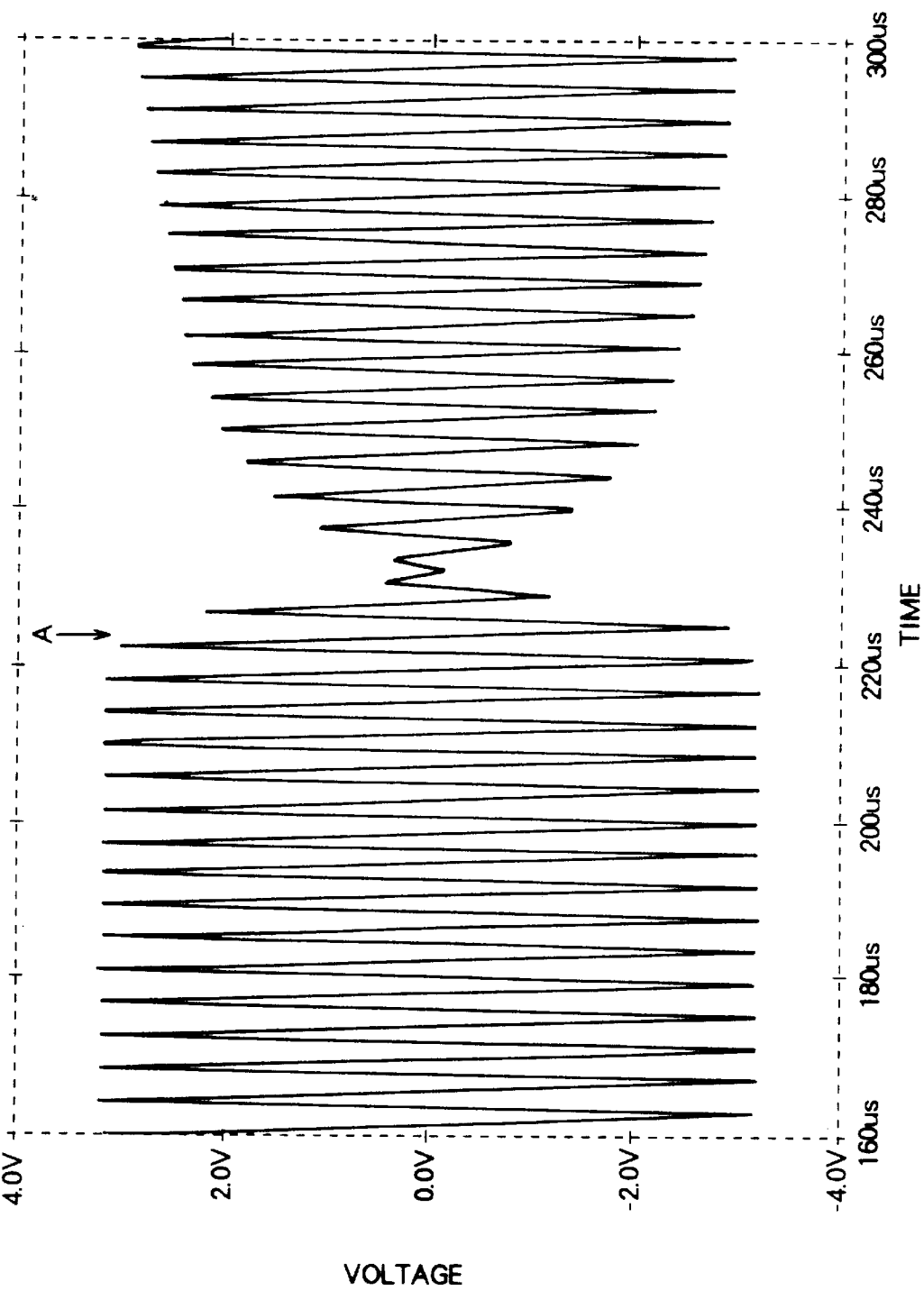
FIG. 13 is a waveform chart available for explanation of a reception state in an ninth embodiment of this invention in a state where the Q of a resonance circuit is high.

It is desirable in power reception that the card side antenna resonance circuit (see 4 in FIG. 1) has a high Q, while the high Q creates a problem that a relatively long time is taken for the variation of the amplitude appearing in the resonance circuit due to the received data as shown in FIG. 13, which results in difficulty to increase the data transmission speed. Although in the foregoing respective embodiments the data detection is made on the basis of the detection of the decrease in voltage in the antenna resonance circuit in the card side, the increase in Q of the antenna resonance circuit causes slow restoration of the voltage in the antenna resonance circuit after the data detection. This slow restoration makes the data transmission slow down. Accordingly, in this embodiment, in the card the phase of the voltage induced in the antenna resonance circuit is made to be coincident with the phase of the oscillation of the resonance circuit after the data detection in order to facilitate the restoration of the amplitude in the resonance circuit.

In this embodiment, the card circuit arrangement is basically the same as that of the card 10 of FIG. 1, while the frequency is reduced to ½ at phase modulation as shown in (c) of FIG. 2 as well as in the foregoing third embodiment. For this reason, the control section is designated at reference numeral 17*a*. The output transistor 9, the output capacitor 11, the transistor driving circuit 12 and a portion of the control section 17*a* compose the phase adjusting means. Of these, the output transistor 9, the output capacitor 11 and the transistor driving circuit 12 are also used for the resonance frequency switching means in the foregoing third embodiment.

Figure 14:
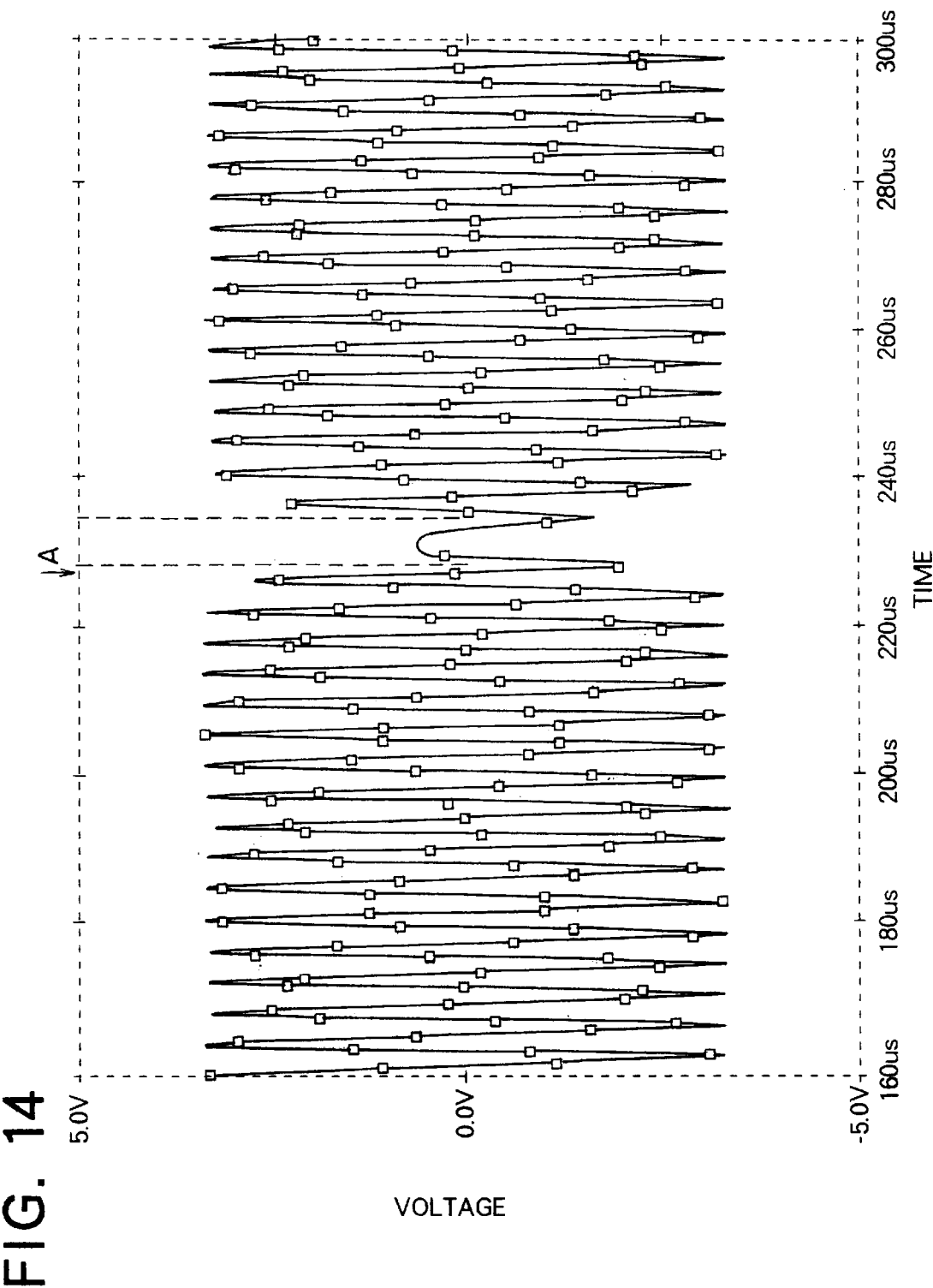
FIG. 14 is a waveform chart useful for explanation of demodulation in a card according to the ninth embodiment.

In operation, after the detection of data variation as shown in FIG. 14, the output transistor 9 is turned on during half a period (180°) so that the output capacitor 11 gets into connection with the antenna resonance circuit 4, which changes the resonance frequency of the resonance circuit 4 to ½ for phase coincidence. This allows the modulation circuit to be shared at the time of the data transmission from the card to the R/W unit and, therefore, produces a great merit. As a result, in the card side the time from the detection of the variation to the restoration can be shortened at data transmission from the R/W unit to the card so that the data transmission speed can increases. In addition, in this case the resonance frequency switching means used in the modulation for the data transmission from the card to the R/W unit in the foregoing third embodiment can be shared, with a great advantage.

Embodiment 10

Figure 15:
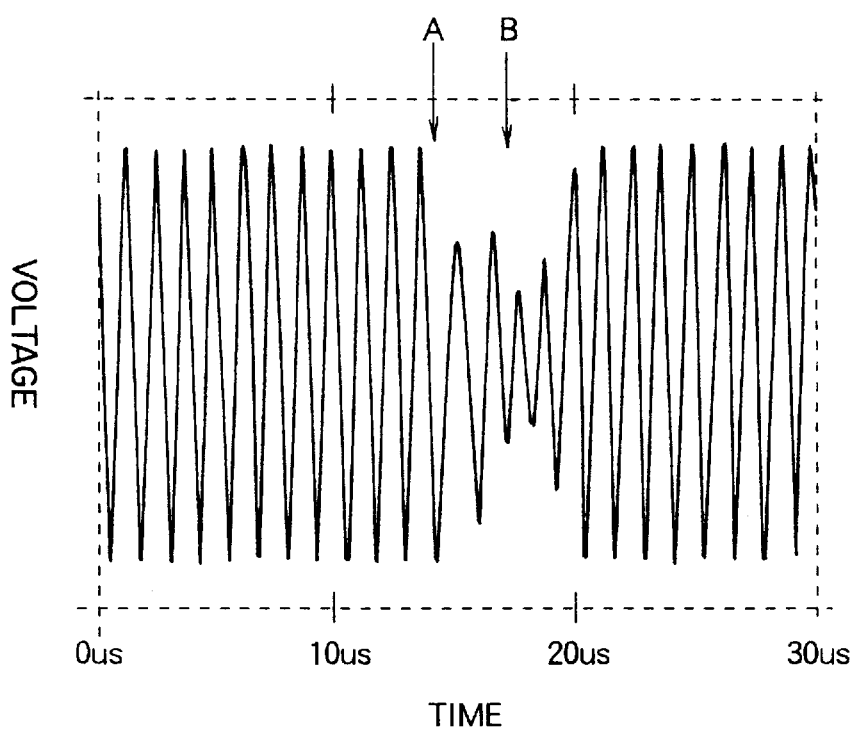
FIG. 15 is a waveform chart useful for describing a demodulation in the ninth embodiment when the Q of a resonance circuit is low.

Moreover, a description will be made hereinbelow of a tenth embodiment of this invention. This tenth embodiment relates to an arrangement which can make sure that the card receives data in a case where the card is close to the R/W unit. In the foregoing ninth embodiment the Q of the antenna resonance circuit in the card becomes low when the card is close to the R/W unit, with the result that the delay due to the antenna resonance circuit becomes extremely little. In addition, since the modulation speed of the transmission antenna resonance circuit in the R/W unit is high, even if a phase variation as shown in FIG. 15 is detected at a position indicated by character A and the phase is intended to be changed as described in the ninth embodiment, the phase previously varies, with result that as indicated by character B the decrease in amplitude again takes place. For this reason, in this embodiment, for avoiding malfunction, the detection of the turning point is inhibited for a given period of time after the turning point is once detected by the circuit arrangement taken in the ninth embodiment.

Figure 16:
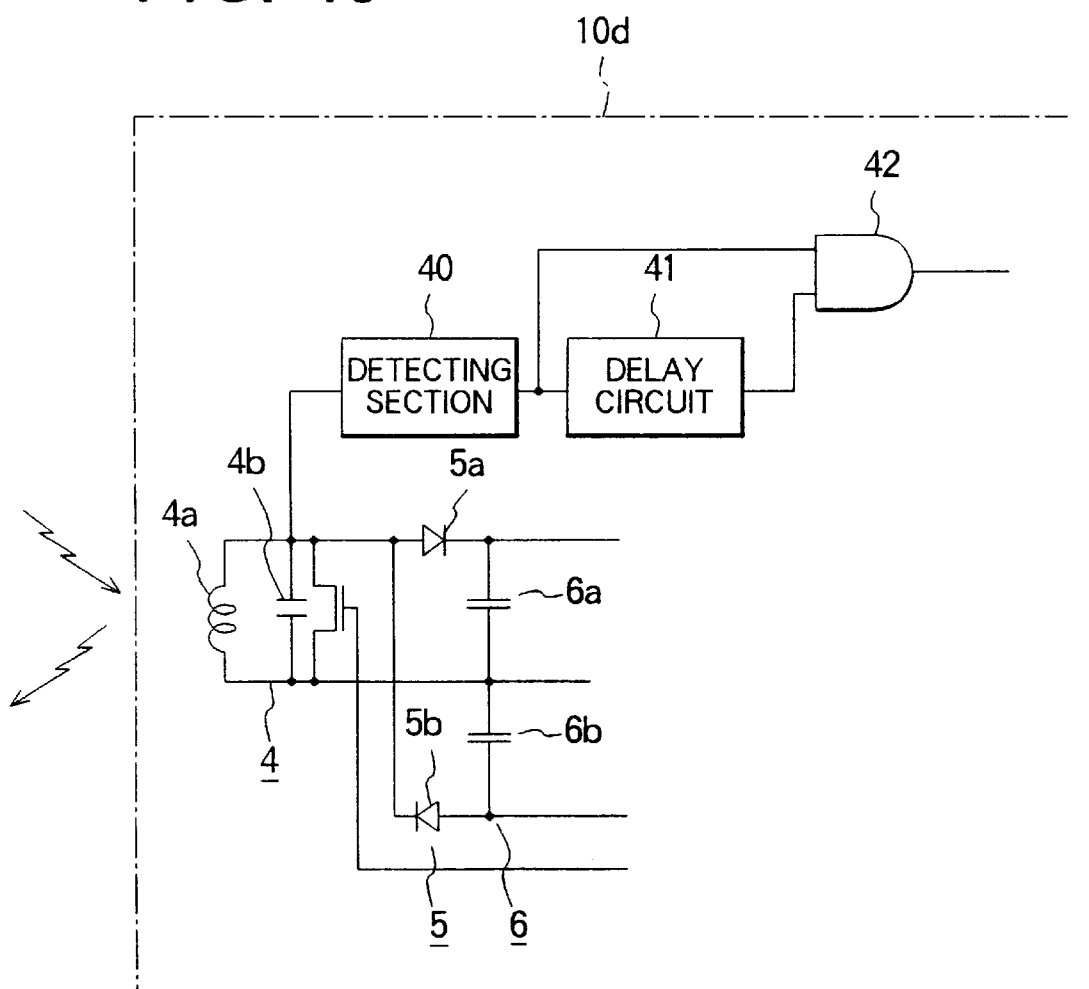
FIG. 16 is an illustration of a circuit arrangement of a non-contact type IC card according to this invention.

FIG. 16 schematically shows an arrangement of a principal part of a card 10d in this embodiment. The basic arrangement is the same as that in FIG. 1. In FIG. 16, a detecting section 40 is for detection of the turning point, and a delay circuit 41 is for making delay to inhibit the detection of the turning point for a predetermined period of time after the detecting section 40 detects the turning point. The detecting section 40 and the delay circuit 41 make up the phase variation detection inhibiting means. The outputs of these parts are led through an AND gate 42 to a control section (17, 17a). This arrangement allows the demodulation of unnecessary data to be avoidable even if the amplitude again decreases after the detection of phase variation and permits stable data reception regardless of short distance.

Incidentally, FIGS. 7, 10 to 15 are based upon computer simulation analysis.

Embodiment 11

Figure 17:
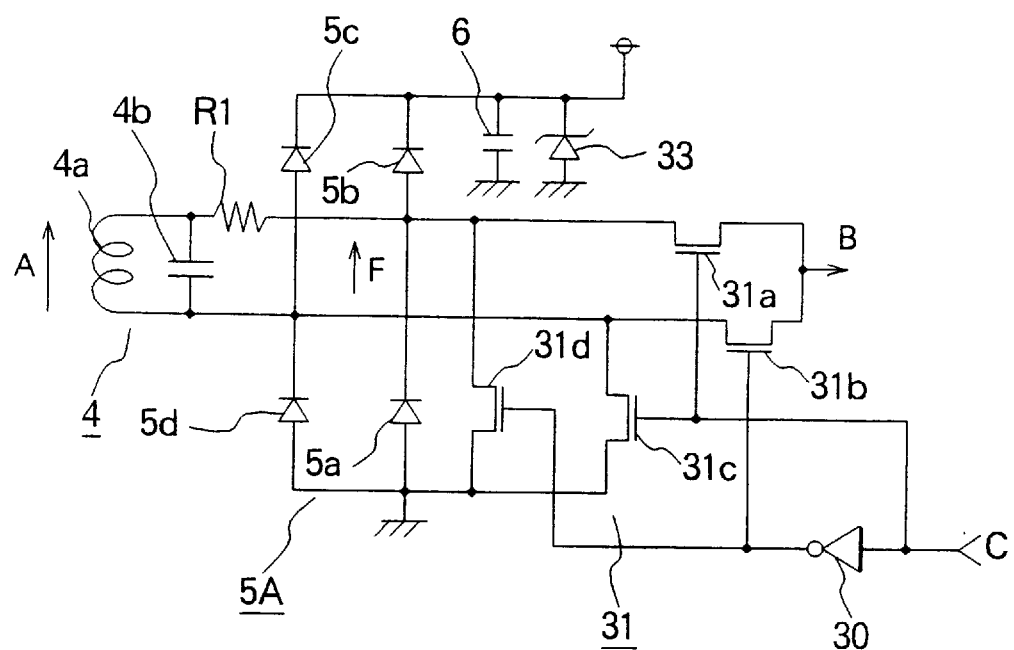
FIG. 17 is an illustration of one example of a circuit arrangement of a non-contact type IC card according to an eleventh embodiment of this invention.

Furthermore, a description will be taken hereinbelow of an eleventh embodiment of this invention in relation to FIG. 17 showing a portion of an arrangement of a card. In this arrangement, a bridge rectifying circuit 5A is employed as the rectifying circuit, with the result that the amplitude in the antenna resonance circuit 4 can be taken up to the voltage of the power source, i.e., up to two times that in the FIG. 1 half-wave voltage doubler rectifying circuit. Since the signal inputted is doubled for use in the half-wave voltage doubler rectifying circuit, if the card circuits operate on 3 V, then the signal to be treated between the R/W unit and the card assumes 1.5 V. On the other hand, since the use of the bridge rectifying circuit 5A can accept the operating voltage of the card circuits, i.e., a 3 V signal, more accurate signal transmission and reception become possible.

Figure 18A:
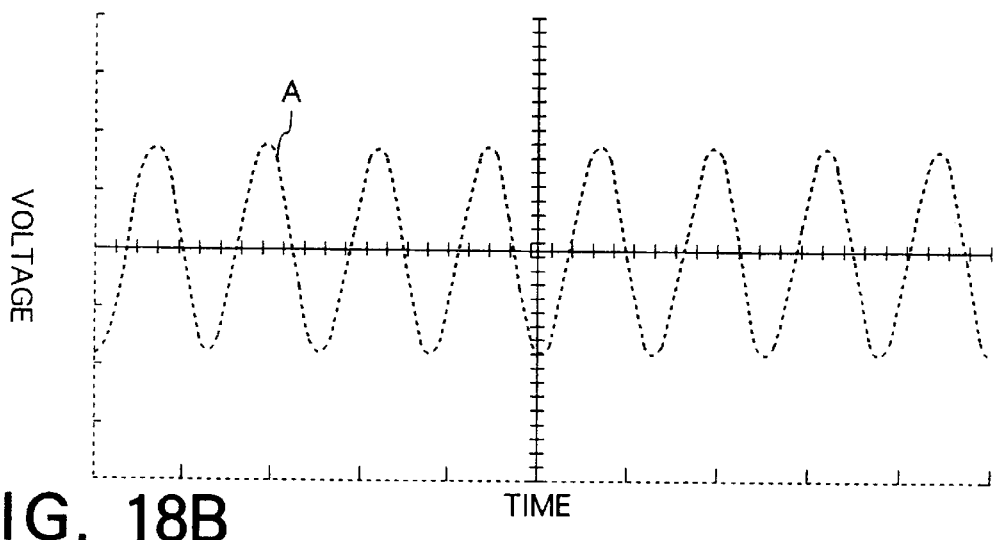
FIGS. 18A and 18B show waveforms in the FIG. 17 card circuit arrangement.
Figure 18B:
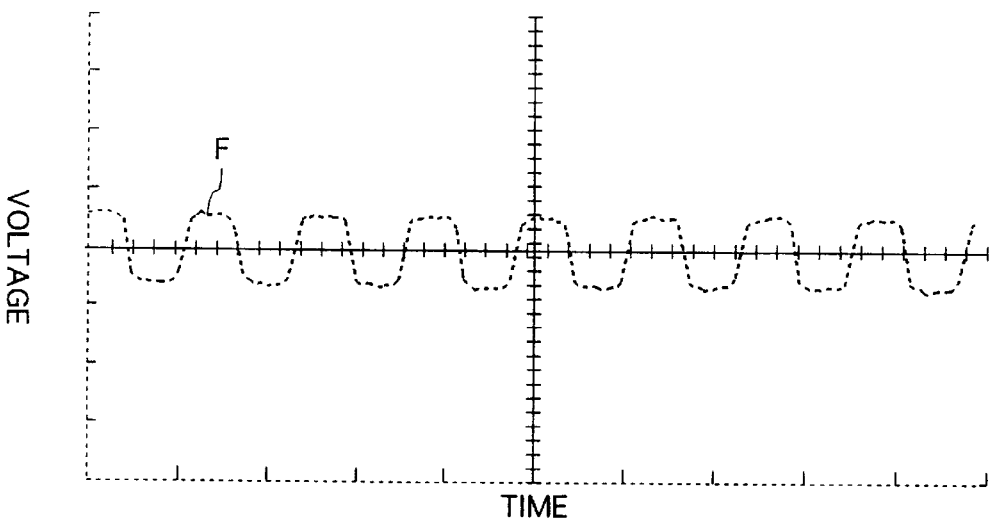

In FIG. 17, parts corresponding to those in the above-described embodiments are marked with the same reference numerals. In the same illustration, the card comprises a full-wave bridge rectifying circuit 5A make up of rectifying devices 5a to 5d, an inverter 30, a switching circuit 31 composed of N-channel transistors 31a to 31d, a Zener diode 33 for obtaining a constant source voltage, an energy storage circuit for smoothing the rectified voltage to store energy, and a resistor R1. FIG. 18A shows a voltage A between both terminals of the FIG. 17 antenna resonance circuit 4, and FIG. 18B shows an output F before the bridge rectifying circuit 5A (not shown to be in synchronism with the voltage A).

The antenna resonance circuit 4 develops sine-wave oscillation in extraction of a signal, and current flows into the bridge rectifying circuit 5A while it exceeds Vcc. At this time, the voltage at a lower-voltage terminal of the antenna resonance circuit 4 assumes a value slightly lower than GND, while the voltage at a higher-voltage terminal thereof assumes a value higher than Vcc. On the other hand, while the voltage in the antenna resonance circuit 4 is lower than Vcc, the current does not flow into the bridge rectifying circuit 5A so that the voltage in the antenna resonance circuit 4 takes a floating state between Vcc and GND, and becomes unstable at extraction of the signal. Accordingly, the lower-voltage terminal of the antenna resonance circuit 4 is made to take the GND potential, while the voltage at the higher-voltage terminal thereof is extracted as a signal. This operation relies upon the switching circuit (grounding means) 31 operable in accordance with a switching signal C shown in FIG. 17. This can enhance the amplitude of the antenna resonance circuit 4 to allow the use of a larger signal, thus resulting in precise process. In addition, the extracted signal takes a rectified state, which makes no problem associated with whether the amplitude is positive or negative. This can facilitate the process.

Embodiment 12

Figure 19:
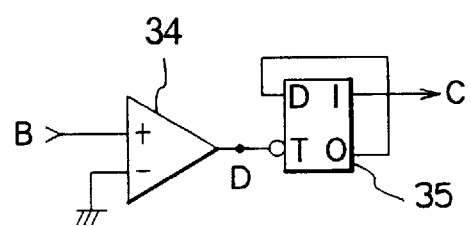
FIG. 19 shows an arrangement of a switching signal generating circuit according to a twelfth embodiment of this invention.
Figure 20:
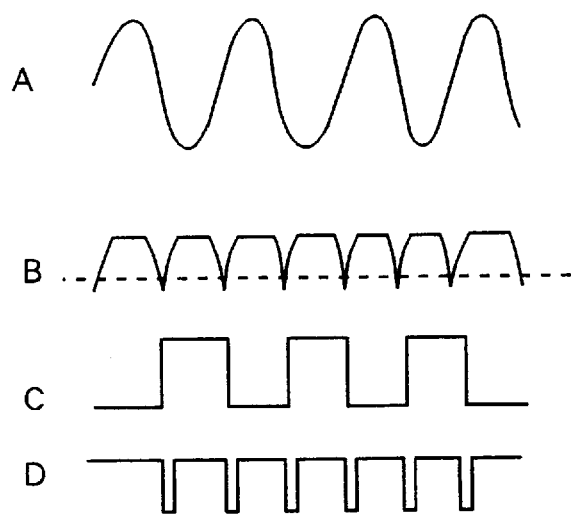
FIG. 20 shows waveforms in the FIG. 19 circuit arrangement.

Moreover, a description will be made of a twelfth embodiment with reference to FIG. 19. FIG. 19 is an illustration of one example of a signal generating circuit effective to generate a switching signal to the switching circuit 31 by which the lower-voltage terminal of the antenna resonance circuit 4 is grounded. In the illustration, the signal generating circuit is composed of a comparator 34 and a D-type flip-flop 35. In addition, FIG. 20 shows waveforms in the FIGS. 17 and 20 circuits. The comparator 34 detects the fact that an input, or incoming, signal B becomes lower than a ground level indicated by a dotted line, then inverting a signal by which the lower-voltage terminal of the antenna resonance circuit 4 is grounded. This arrangement can ground the lower-voltage terminal of the antenna resonance circuit 4 and extract a signal from the higher-voltage terminal thereof.

Embodiment 13

Furthermore, a description will be made hereinbelow of a thirteenth embodiment of this invention. This embodiment is for the purpose of realizing detection strongly resistive to the fluctuation of a received voltage of the card due to the variation of distance between the R/W unit and the card in the case of the data transmission on the phase modulation. Contrary to the above-described embodiments in which the phase variation is determined on the basis of the amplitude, in this embodiment a reference phase signal is obtained through a phase-locked loop circuit so as to be compared in phase with the received signal, the phase variation being detected as a function of the difference in phase therebetween. Thus, the card is unaffected by the amplitude variation.

Figure 21:
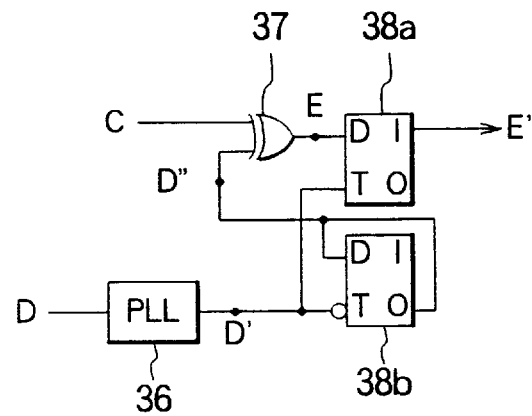
FIG. 21 is an illustration of one example of a circuit arrangement of a detection section of a non-contact type IC card according to a thirteenth embodiment of this invention.
Figure 22:
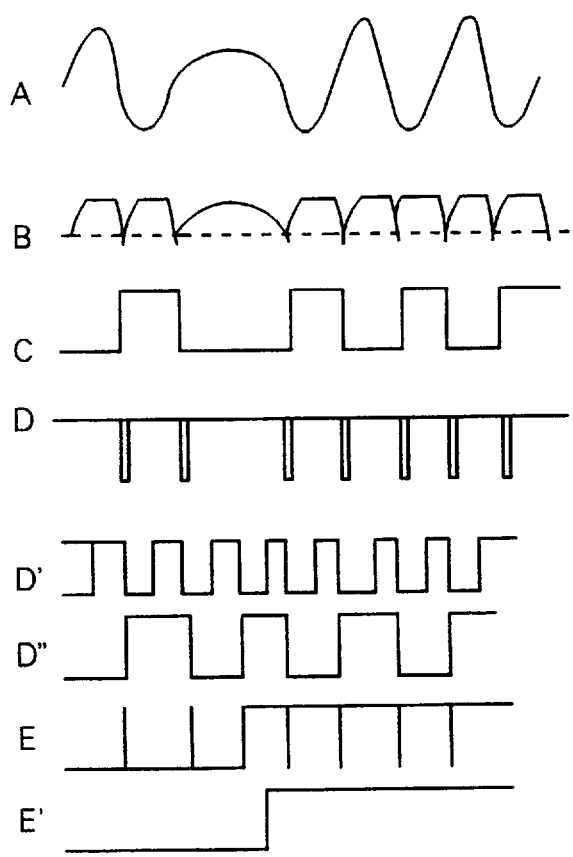
FIG. 22 shows waveforms in the FIG. 21 detection section circuit arrangement.

FIG. 21 illustrates an arrangement of detection section (detecting means) provided in a control section (for example, the left-hand side of the FIG. 17 circuit) of the card according to this embodiment, and FIG. 22 shows waveforms therein. In FIG. 21, included in the detection section are a PLL (phase-locked loop circuit), an EX-OR circuit 37 and D-type flip-flops 38a, 38b. Signals C and D in FIG. 22 are obtainable, for example, from the FIG. 19 circuit. The detection section contains the PLL 36 and receives, as an input signal to the PLL 36, the signal D indicative of the fact that the input signal B goes below the ground level and then produces an output signal D' tuned to the input signal D. This output signal D' is divided to ½ in the D-type flip-flop 38b to create a reference phase signal D". The EX-OR 37 makes EX-OR of the reference phase signal D" and the switching signal C in the twelfth embodiment, the EX-OR result being sampled by the output signal D' of the PLL 36 at every half a period in the D-type flip-flop 38a (shaping a signal E), thereby producing a detection output E'. Incidentally, the switching signal C corresponds in phase to the received signal. The EX-OR operation of the switching signal C and the reference phase signal D" and the sampling thereof at an interval of half a period can ensure an high-quality detection output.

Embodiment 14

Figure 23:
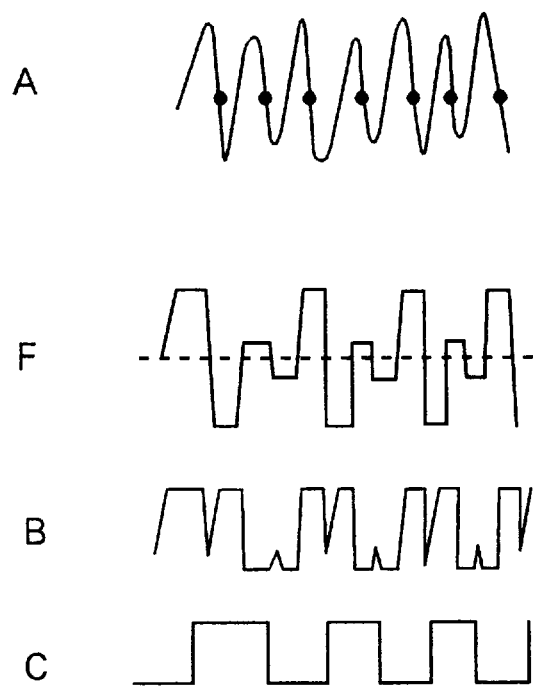
FIG. 23 is a waveform chart available for explanation of operations of a non-contact type IC card according to a fourteenth embodiment of this invention.
Figure 24:
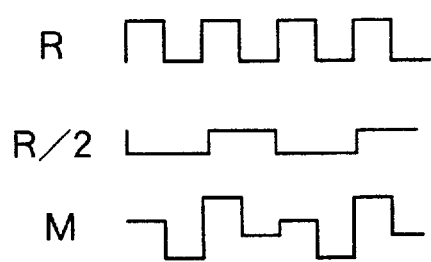
FIG. 24 is a waveform chart useful for describing a composite wave due to a combination of a reference frequency and a frequency being ½ of the reference frequency.

Still further, a description will be made hereinbelow in terms of a fourteenth embodiment of this invention. This embodiment is for the purpose of accomplishing high-speed communication on the condition that the R/W unit and the card are separated from each other to some extent. More specifically, in order that the R/W unit can receive data from the card while continuously supplying power to the card side, the frequency of the power supplied from the R/W unit to the card is set to be different from the frequency (carrier) for the transmission from the card to the R/W unit. FIG. 23 illustrates waveforms developed in this case. In the twelfth embodiment the switching signal C is inverted, for example, as shown in FIG. 20 such that the lower-voltage terminal of the antenna resonance circuit 4 is coupled to GND while the higher-voltage terminal thereof is extracted as a signal whenever the amplitude of the voltage waveform A between both the terminals of the antenna resonance circuit 4 passes through the zero cross points (polarity inverting points). On the other hand, in this fourteenth embodiment the switching signal C is designed to be inverted at every other zero cross point but not at every zero cross point as indicated by C of FIG. 23. Accordingly, while the switching signal C is in the non-inverted condition, before the zero cross the lower-voltage terminal is coupled to GND while the higher-voltage terminal contributes the extraction of a signal, and after the zero cross the higher-voltage terminal is grounded while the lower-voltage terminal gives a signal. In addition, the higher-voltage terminal is grounded whereas the lower-voltage terminal produces a signal, and after the zero cross the lower-voltage terminal is grounded whereas the higher-voltage terminal creates a signal. The signals from the high-voltage terminal of the antenna resonance circuit 4 are used to charge Vcc through the bridge rectifying circuit 5A, while the signals from the lower-voltage terminal thereof are clamped at GND-α (slightly lower than GND) through the bridge rectifying circuit 5A. That is, the clamping effected through the Zener diode 33 is repeated two times at Vcc and two times at GND, thus producing a waveform indicated by F in FIG. 23. As obvious from FIG. 24, this waveform is the same as the composite wave M of a reference frequency R and a frequency R/2 being ½ of the reference frequency R. Thus, it will be understood that the voltage A between both the terminals of the antenna resonance circuit 4 includes the carrier for data transmission the frequency of which is ½ of the frequency of the power reception wave. Incidentally, the resistor R1 in FIG. 17 is for the purpose of adjusting the strength of the transmission carrier from the card.

A flip-flop is provided which is inverted when the switching signal does not come into inversion, and assuming the EX-OR with that signal, the same input signal as that at reception is obtainable. Therefore, because of the same input signal being obtainable with a simple arrangement, the arrangement of the control circuit goes easy, and further, since the carrier is generated by grounding, there results in less consumption of the energy rectified and stored. It is also possible to employ other ways, such as to use a PLL so that the grounding transistor (see 31c, 31d in FIG. 17) simultaneously turns on. In addition, as will be described later, the carrier for data transmission is not limited to the frequency being ½ of that of the power reception wave, whereas the frequency of the carrier can also be set to ¼, ⅛ or more of that of the power reception wave obtainable by the dividing of the power reception wave. Even in this case, the same effect shows.

Embodiment 15

Figure 25:
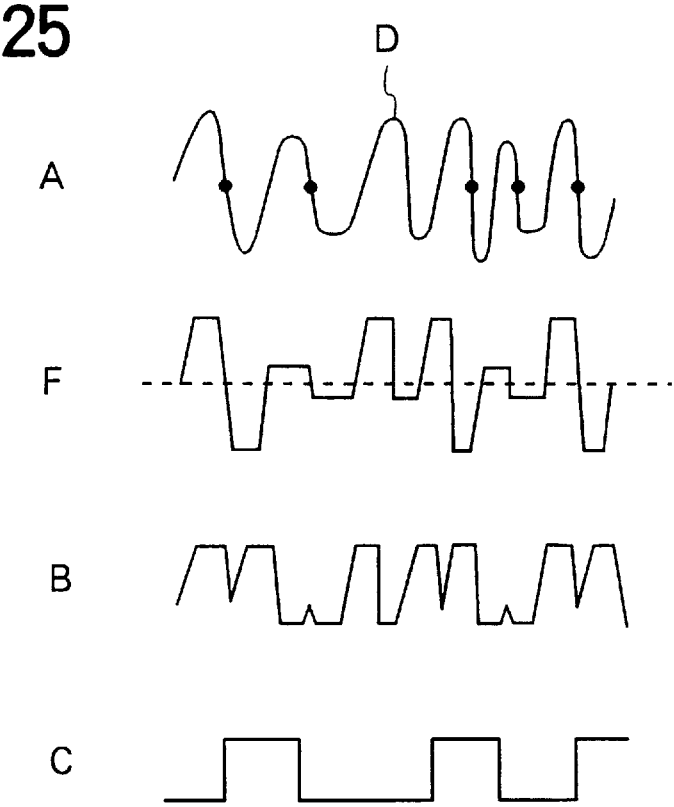
FIG. 25 is a waveform chart useful for explaining operations of a non-contact type IC card according to a fifteenth embodiment of this invention.
Figure 26A:
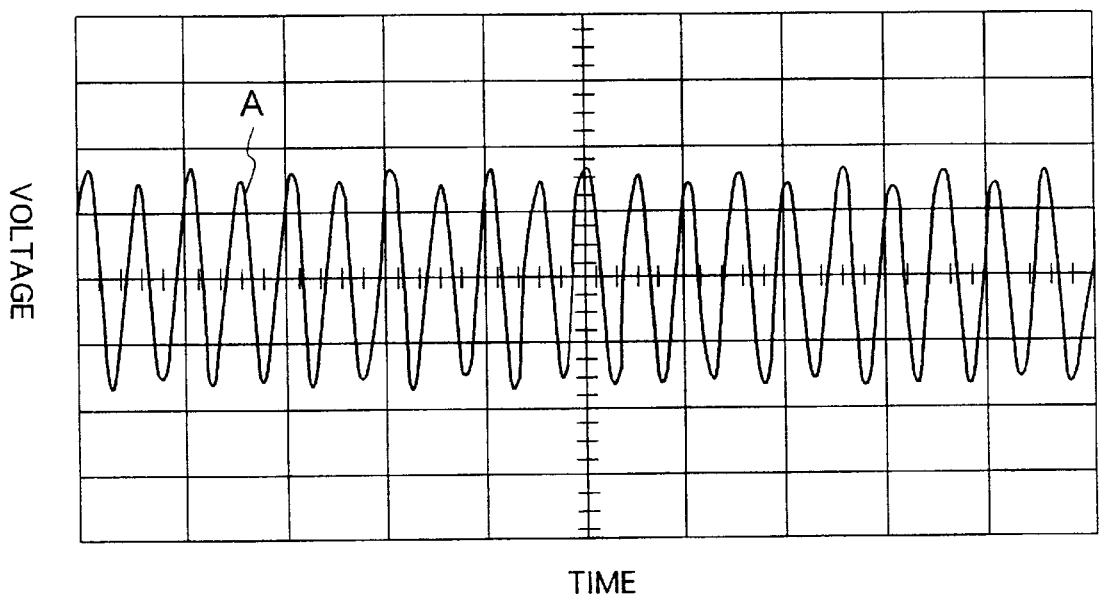
FIGS. 26A and 26B are waveform charts showing actual signals in the fifteenth embodiment.
Figure 26B:
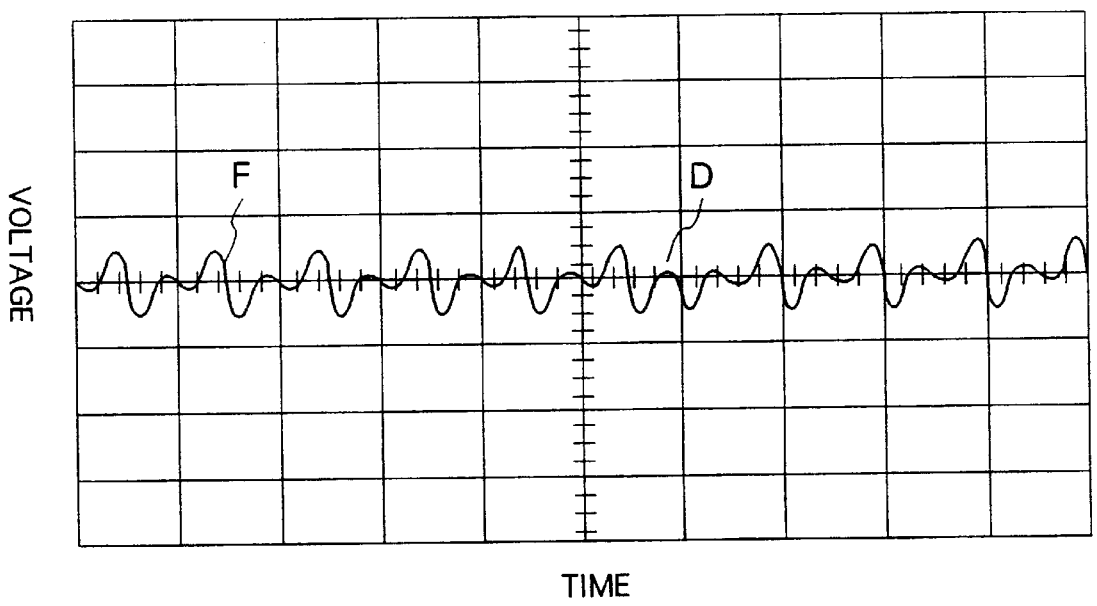

Moreover, a description will be taken hereinbelow of a fifteenth embodiment of this invention. This embodiment is particularly for realizing the modulation of the carrier produced in the foregoing fourteenth embodiment. In the fourteenth embodiment the length of the switching signal C is doubled at the time of the modulation as shown in FIG. 25 so as to carry out the modulation in a binary phase shift keying mode. In other words, although in the fourteenth embodiment the inversion of the switching signal is performed at every other zero cross point, in this embodiment the inversion thereof is made at every four zero cross points at the time of the modulation as indicated by D in FIG. 25. FIG. 26A shows an actual form of the signal A and FIG. 26B illustrates an actual form of the signal F where D denotes a portion modulated.

With this arrangement, the transmission carrier having a frequency which is ½ of that of power frequency takes place simultaneously with the reception of the power, and the resultant transmission carrier is phase-modulated, whereby the data is transmittable, for example, to the R/W unit side. Similarly, the carrier for data transmission is not limited to ½ of the frequency of the power reception wave, whereas the frequency of the carrier can also be set to ¼, ⅛ or more of that of the power reception wave obtainable by the dividing of the power reception wave. Even in this case, the same effect shows.

Embodiment 16

Figure 27A:
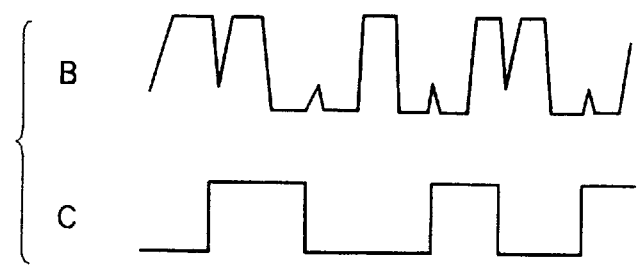
FIGS. 27A and 27B are waveform charts useful for explaining operations of a non-contact type IC card according to a sixteenth embodiment of this invention.
Figure 27B:
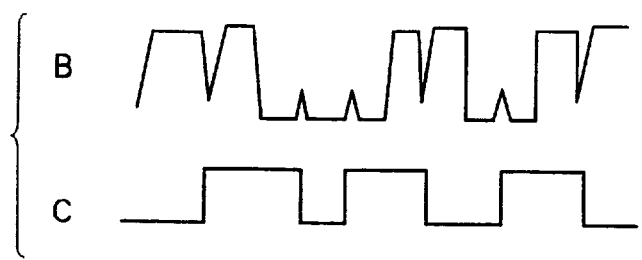

Furthermore, a description will be made hereinbelow of a sixteenth embodiment of this invention. This embodiment particularly presents more improvement of the data transmission speed than obtained in the foregoing fifteenth embodiment by increasing the information amount in one signal. In the foregoing fifteenth embodiment the switching signal C is switched at every four zero cross points of the voltage waveform A between both the terminals of the antenna resonance circuit 4 as shown in FIG. 25, thereby attaining the binary phase shift keying mode. On the other hand, in this embodiment, in addition to this the switching is performed at every three zero cross points of the voltage waveform A between both the terminals of the antenna resonance circuit as shown in FIG. 27A and further performed continuously without separation as shown in FIG. 27B, there results in realization of a quad phase shift keying mode (phase modulation on four kinds of phases: 0°, 90°, 180°, 270°). The Quad phase shift keying mode permits the supply of doubled information as compared with the binary phase shift keying mode, thus virtually doubling the data transmission speed. Accordingly, this makes double the data transmission speed (doubled transmission information amount) on the same modulation speed. Incidentally, in the embodiments 14 and 15, further development is possible.

Figure 28:
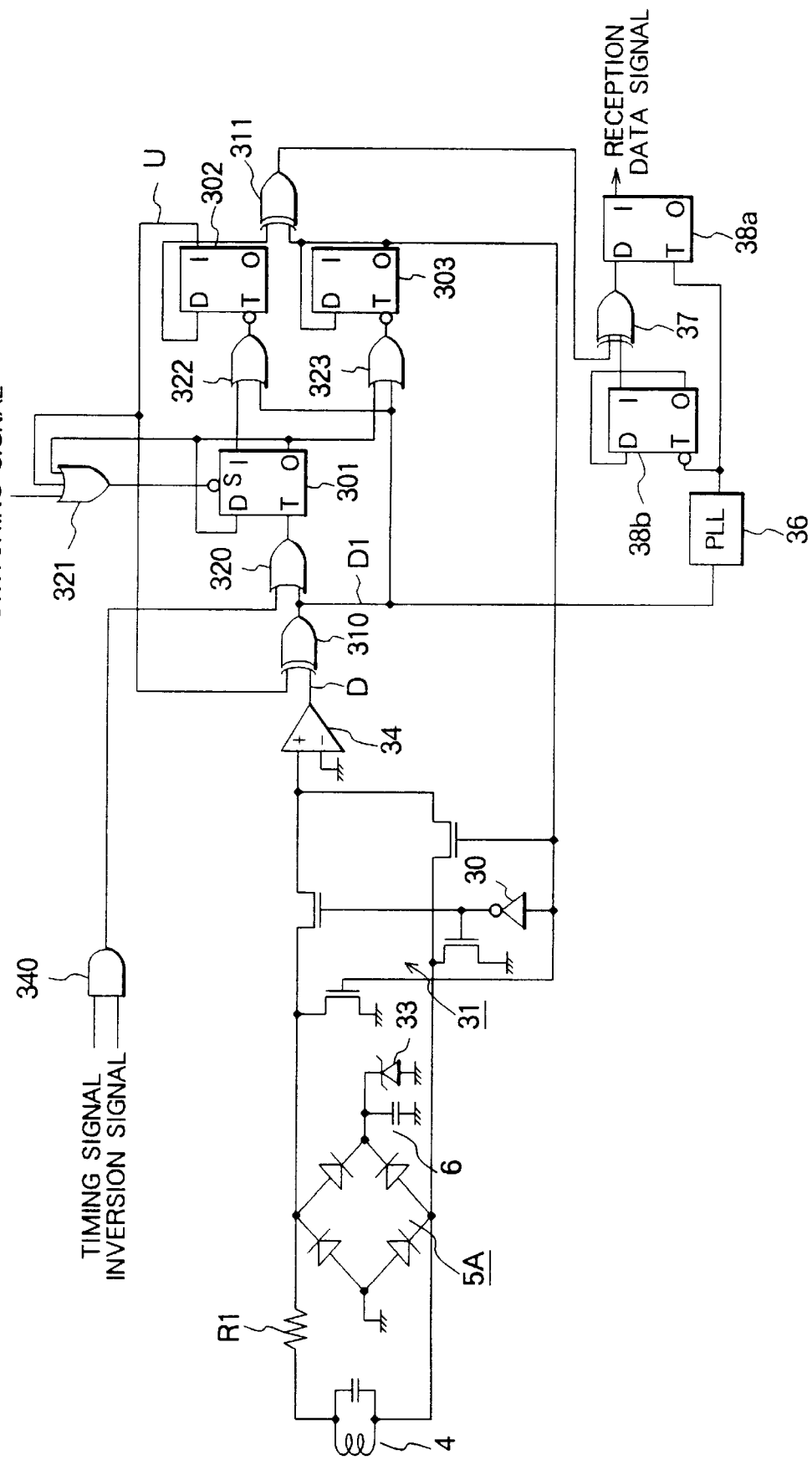
FIG. 28 illustrates one example of a card circuit arrangement where data transmission is performed in a binary phase shift keying mode using a carrier whose frequency is ½ of the power frequency.
Figure 29:
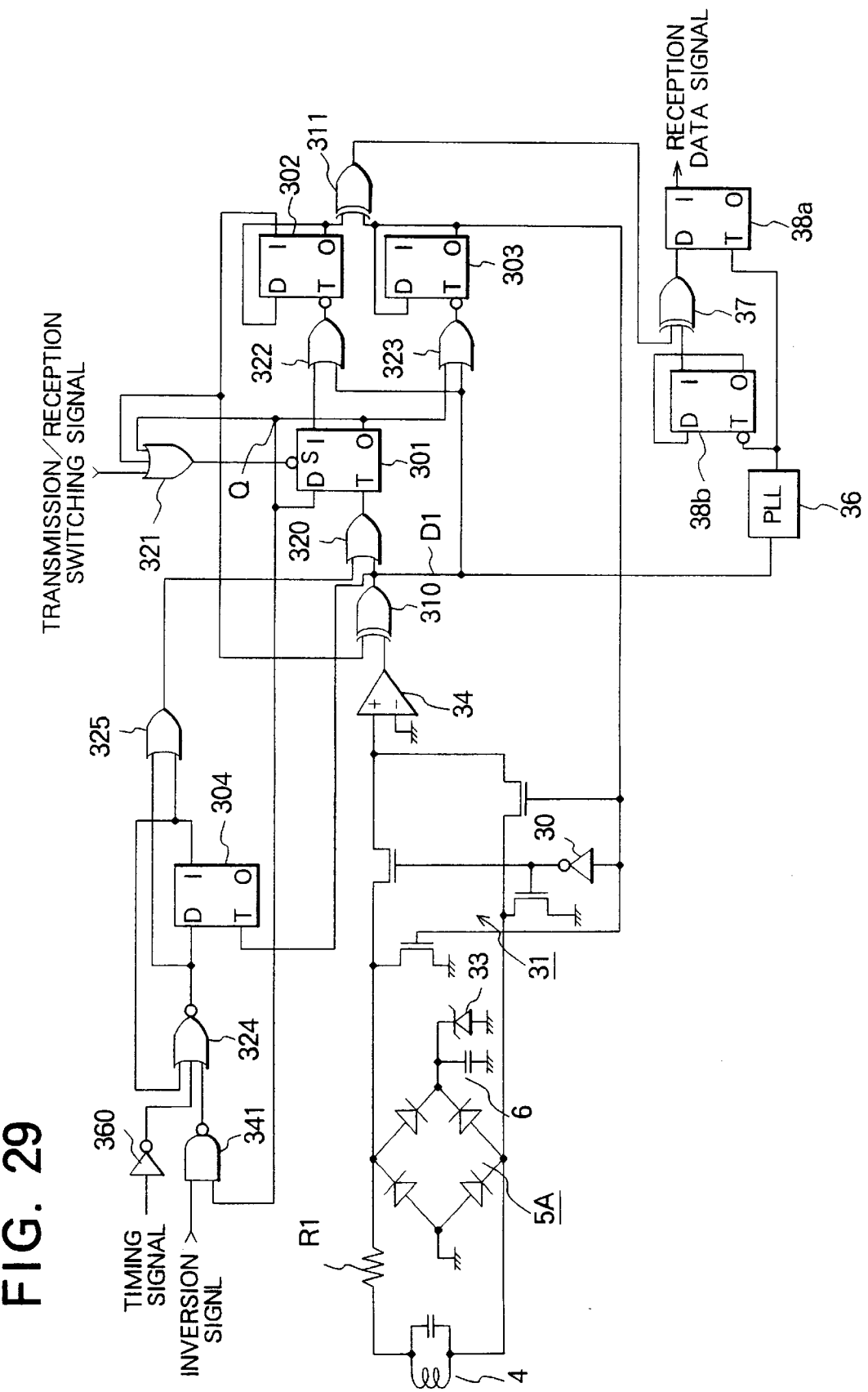
FIG. 29 illustrates another card circuit arrangement where data transmission is performed in a binary phase shift keying mode using a carrier whose frequency is ½ of the power frequency.
Figure 30:
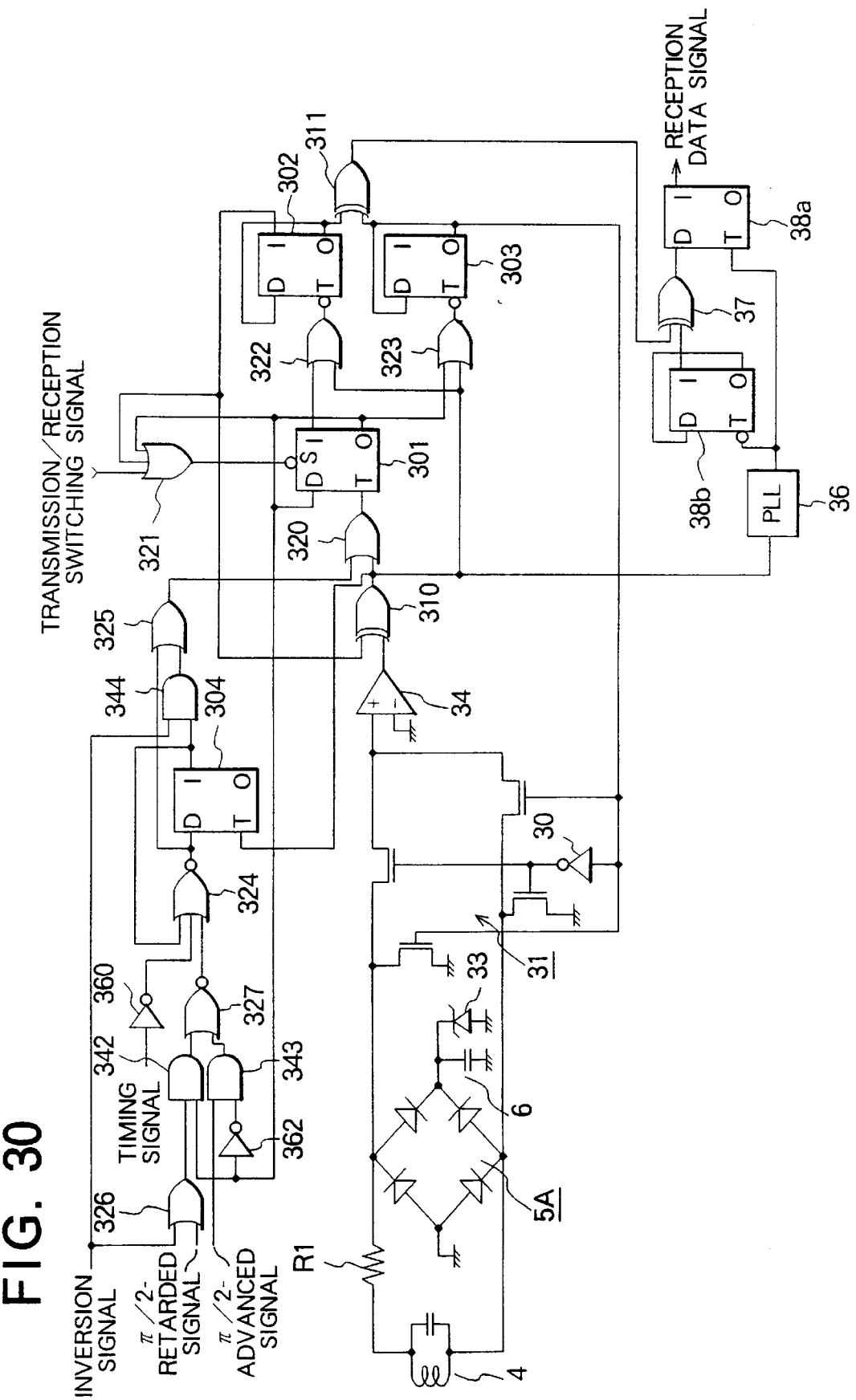
FIG. 30 shows one example of a card circuit arrangement by which data transmission is carried out in a quad phase shift keying mode using a carrier whose frequency is ½ of the power frequency.
Figure 31:
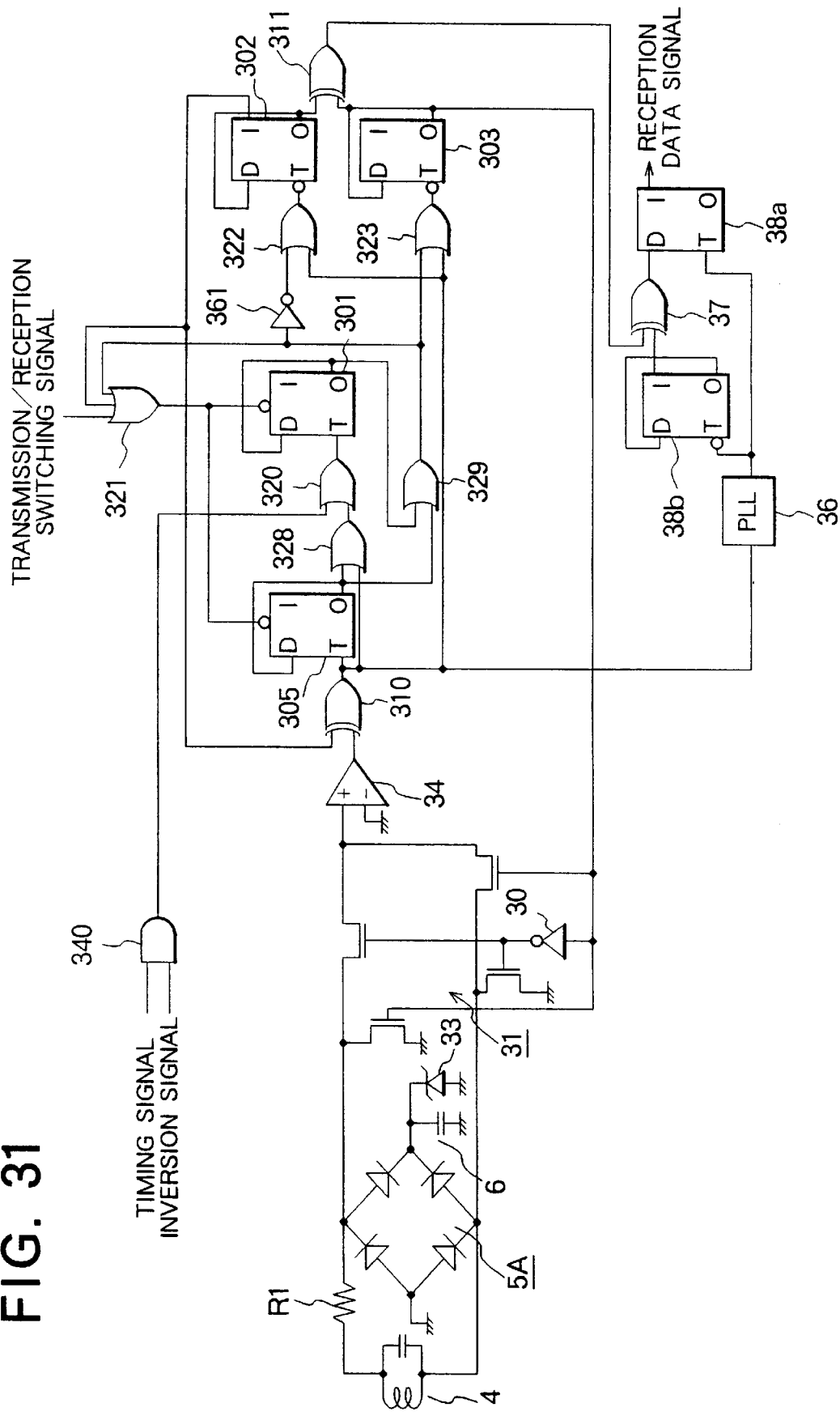
FIG. 31 is an illustration of one example of a card circuit arrangement for data transmission in a binary phase shift keying mode using the carrier whose frequency is ¼ of the power frequency.
Figure 32:
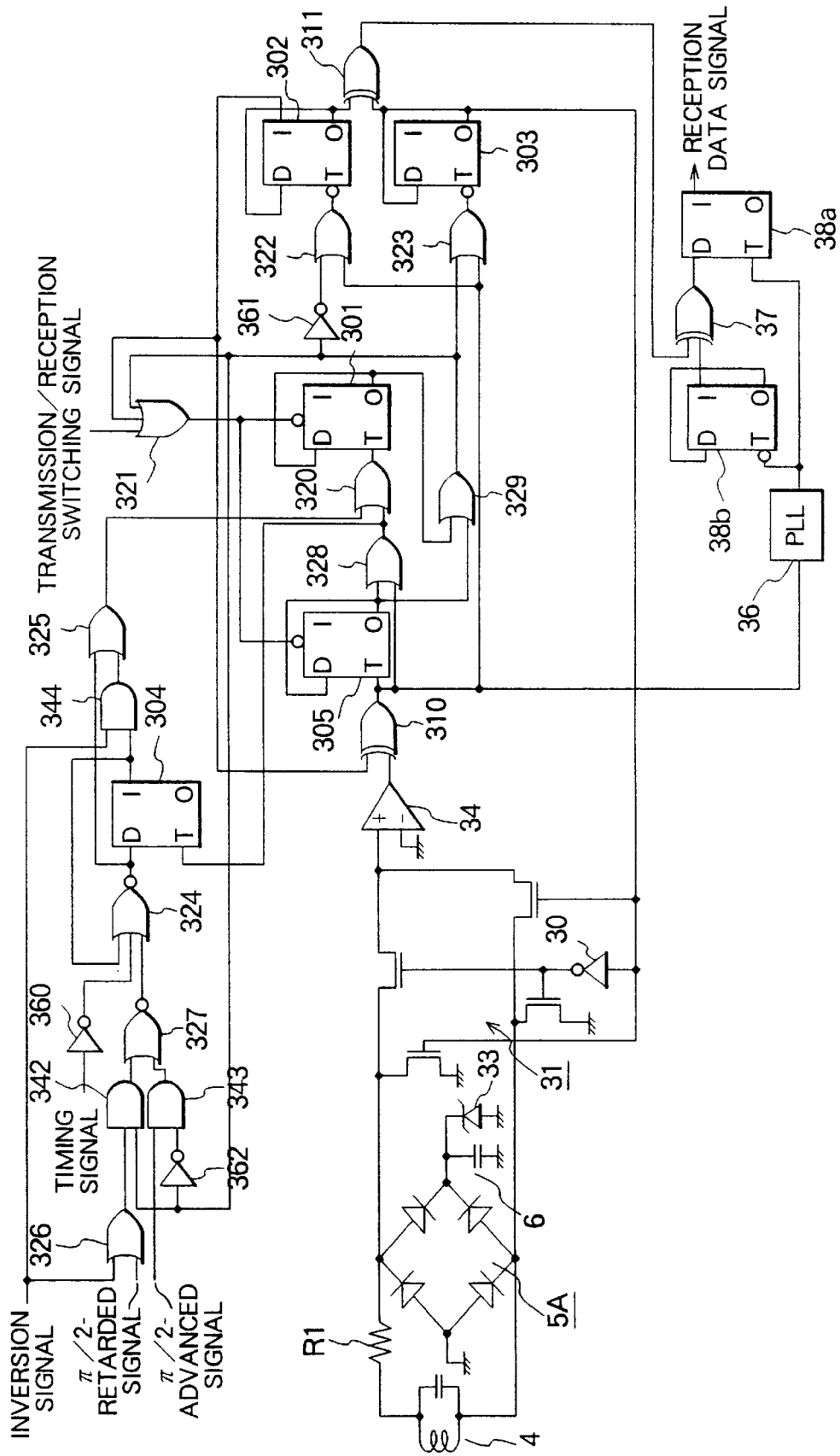
FIG. 32 is an illustration of one example of a card circuit arrangement for data transmission in a quad phase shift keying mode using a carrier whose frequency is ¼ of the power frequency.

FIGS. 28 to 32 show circuit arrangements of the card in the fourteenth through sixteenth embodiments whereby the power transmission frequency from the R/W unit to the card is designed to be different from the data transmission frequency (carrier frequency) so that the data transmission is implemented on the phase modulation in the binary phase shift keying mode or quad phase shift keying mode. Of these drawings, FIGS. 28 and 29 illustrate card circuit arrangements where the data transmission is performed in the binary phase shift keying mode (phase modulation based on two kinds of phases: 0° and 180°) using the carrier whose frequency is ½ of the power transmission frequency. In addition, FIG. 30 shows a card circuit arrangement by which the data transmission is carried out in the quad phase shift keying mode (phase modulation based on four kinds of phases: 0°, 90°, 180°, 270°) using the carrier whose frequency is ½ of the power transmission frequency. Moreover, FIG. 31 is an illustration of a card circuit arrangement for the data transmission in the binary phase shift keying mode using the carrier whose frequency is ¼ of the power transmission frequency. Still further, FIG. 32 is an illustration of a card circuit arrangement for the data transmission in the quad phase shift keying mode using the carrier whose frequency is ¼ of the power transmission frequency.

In FIGS. 28 to 32, parts corresponding to those in the above-described embodiments are marked with the same reference numerals. Reference numerals 301 to 305 designate D-type flip-flops, numerals 310, 311 represent EX-OR circuits, numerals 320 to 329 denote OR gates or NOR gates, numerals 340 to 344 depict AND gates or NAND gates, and numerals 360 to 362 indicate inverters.

First of all, a description will be made of the FIG. 28 circuit. This circuit performs the data transmission in the binary phase shift keying mode using the carrier whose frequency is ½ of the power transmission frequency. A PLL 36, EX-OR circuit 37 and D-type flip-flops 38a, 38b constitute a demodulating circuit, i.e., reception circuit (see FIG. 21). In addition, a comparator 34, the EX-OR circuits 310, 311, the OR gates 320 to 323, and the D-type flip-flops 301 to 303 combine to generate a normal switching signal C (see FIGS. 19 and 20) at reception, while, at transmission, dividing the power transmission frequency into ½ using the D-type flip-flop 301 to produce a ½-frequency carrier (carrier having ½ of the power transmission frequency) so that the modulation in binary phase shift keying mode is accomplished in accordance with a signal, i.e., a transmission data from the AND gate 340.

A transmission/reception switching signal to be inputted in the OR gate 321 comes into a L level state at reception, whereby the D-type flip-flop 301 gets into a fixed state but not performing the dividing. On the other hand, at transmission it turns into an H level state, with the result the D-type flip-flop 301 divides the power frequency to ½ so as to generate a ½-frequency carrier. Thereafter, this carrier is modulated in the binary phase shift keying mode in accordance with the signal being a transmission data from the AND gate 340. The AND gate 340 issues a signal obtained by gating an inversion signal on the transmission data in response to a timing signal.

Figure 33A:
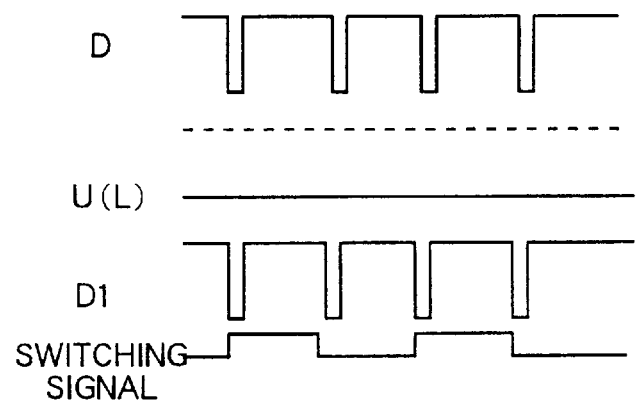
FIGS. 33A and 33B are waveform charts available for explanation of the operations of FIGS. 28 to 32 circuits.
Figure 33B:
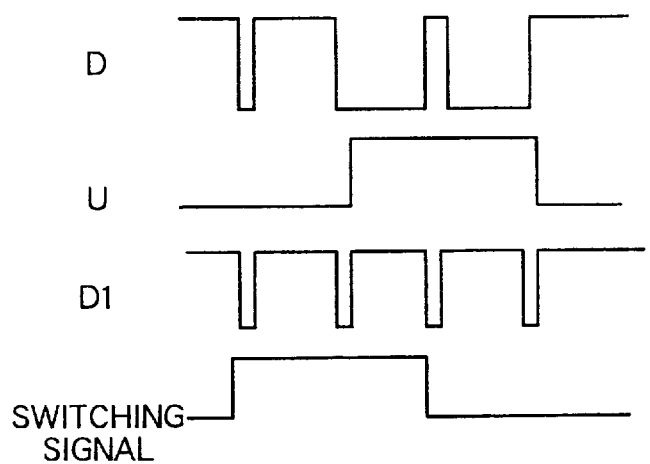

Furthermore, an action associated with the D-type flip-flop 302 will be described here with reference to FIGS. 33A and 33B. FIG. 33A shows the output D of the comparator 34, the output U of the D-type flip-flop 302, the output D1 of the EX-OR circuit 310 and a switching signal at the time of reception, while FIG. 33B illustrates the output D of the comparator 34, the output U of the D-type flip-flop 302, the output D1 of the EX-OR circuit 310 and a switching signal at the time of transmission. In dividing the power frequency for transmission, the D-type flip-flop 302 creates the signal U which inverts when the switching signal does not invert. The EX-OR circuit 310 performs the function of EX-OR of the signal U and the binary output D of the comparator 34, thus obtaining the signal D1 which does not vary irrespective of whether the signal D varies or not at reception and transmission. This signal D1 acts as an input signal to the PLL 36. At data reception the switching signal is treated as a signal representative of the phase of the carrier, while at data transmission it is affected by the transmission carrier, with the result the circuit may form a misjudgment on the presence or absence of the received data. For this reason, the signal D due to the EX-OR of the signal U and the signal D indicative of the switching signal is outputted to the demodulating circuit including the PLL 36, whereby the misjudgment on the data reception is avoidable at transmission.

As well as the FIG. 28 circuit, the FIG. 29 circuit carries out the data transmission in the binary phase shift keying mode using the carrier whose frequency is ½ of the power transmission frequency. This circuit is different therefrom in the section comprising the inverter 360, the NAND gate 341, the NOR gate 324, the D-type flip-flop 304 and the OR gate 325, which generates a signal for modulation with a view to the timings of the output D1 of the EX-OR circuit 310 and output Q of the D-type flip-flop 301. The other operations are basically the same as those of the FIG. 28 circuit. Therefore, the FIG. 28 circuit does not take into consideration the timings for modulation (no problem as it turns out), whereas the FIG. 29 circuit takes into account the timings of the output D1 of the EX-OR circuit 310, the output Q of the D-type flip-flop 301 and so on.

Moreover, the FIG. 30 circuit is designed to perform the data transmission in the quad phase shift keying mode using the carrier whose frequency is ½ of the power frequency. This circuit differs from the FIGS. 28 and 29 circuits in the portions comprising the OR gates 325, 326, the inverters 360, 362, and the AND gates 342 to 344, the NOR gate 324, 327, and the D-type flip-flop 304, which produces a signal which carries out the modulation in the quad phase shift keying mode. With this arrangement, four kinds of phase modulations are practicable: 0° phase when there is no signal, 90° phase when a π/2-retarded signal is set to an H level, 180° phase when the inverting signal is set to an H level, and 270° phase when a π/2-advanced signal is set to an H level.

Furthermore, the FIG. 31 circuit is designed to perform the data transmission in the binary phase shift keying mode using the carrier whose frequency is ¼ of the power frequency, where the two D-type flip-flops 301, 305 are provided to generate the carrier whose frequency is ¼ of the power frequency. The other portions are basically the same as those in FIG. 28. In addition, the FIG. 32 circuit accomplishes the data transmission in the quad phase shift keying mode using the carrier whose frequency is ¼ of the power frequency, and possesses the feature of the FIG. 30 circuit on the data transmission depending on the quad phase shift keying mode together with the feature of the FIG. 31 circuit on the generation of the carrier whose frequency is ¼ of the power frequency.

Embodiment 17

A description will be made hereinbelow in terms of a seventeenth embodiment of this invention. In the third embodiment the output capacitor 11 is connected with the antenna resonance circuit 4 during half a period for the phase modulation, and in the seventh embodiment both the terminals of the transmission antenna resonance circuit 201 in the R/W unit side are short-circuited during half a period for the phase modulation. On the other hand, in this seventeenth embodiment, a PLL 36 (see FIG. 21) is contained in the card as in the thirteenth embodiment so that the length of half a period is obtained on the basis of the output of the PLL 36. Subsequently, both the terminals of the antenna resonance circuit 4 are short-circuited, thus resulting in accomplishing the modulation. FIG. 34 shows a circuit arrangement of the card according to this embodiment, and FIG. 35 shows waveforms in the circuit arrangement. Half a period is found on the basis of the output of the PLL 36, before the output transistor 9 short-circuits the antenna resonance circuit 4 during the half a period after a zero cross point in modulation to realize the binary phase shift keying mode. Consequently, the modulation is possible with no use of the output capacitor 11 in the card side.

Embodiment 18

Furthermore, a description will be made hereinbelow of an eighteenth embodiment of this invention. In the ninth embodiment the data turning point is detected on the basis of the lowering of the amplitude of the antenna resonance circuit in the card side and, in response to the detection thereof, the output capacitor 11 is coupled to the resonance circuit 4 during half a period to set the resonance frequency to ½, thus compulsorily carrying out the demodulation. On the other hand, in this eighteenth embodiment a PLL 36 (see FIG. 21) is incorporated into the card as in the thirteenth embodiment so as to obtain the length of half a period on the basis of the output of the PLL 36, before both the terminals of the antenna resonance circuit 4 are short-circuited with realized high-speed demodulation.

FIG. 36A is an illustration of a circuit arrangement of the card in this embodiment, FIG. 36B illustrates a comparator 16d operative to detect the fact that the amplitude level of the resonance circuit 4 lowers, and FIG. 36C shows waveforms in the circuit arrangement. In this embodiment the half a period is attained on the basis of the output of the PLL 36, and the output transistor 9 short-circuits the antenna resonance circuit 4 during the half a period when the resonance circuit 4 lowers in amplitude level, thereby accomplishing high-speed demodulation. This arrangement does not require the output transistor 11 for the high-speed demodulation and needs only two, i.e., the comparators for the zero cross point and amplitude lowering detection, of the comparators 16a to 16c for detecting the voltage level in the antenna resonance circuit 4.

Embodiment 19

Figure 38:
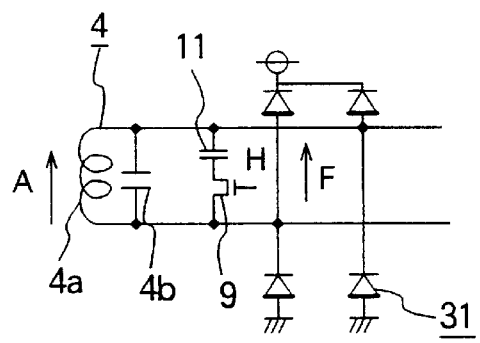
FIG. 38 is an illustration of one example of a circuit arrangement of a non-contact type IC card according to a nineteenth embodiment of this invention.
Figure 39:
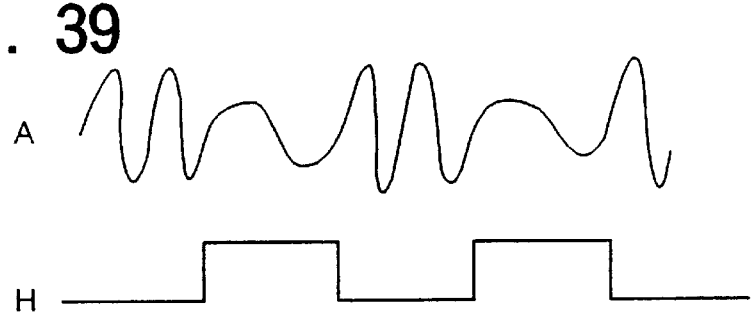
FIG. 39 is an illustration of waveforms in the FIG. 38 circuit.

Still further, a description will be made hereinbelow of a nineteenth embodiment of this invention. This embodiment effects the generation of a transmission carrier whose frequency is ½ of that of a reception wave, using a phase modulating circuit based on the output capacitor as described in the third or ninth embodiment. FIG. 38 illustrates a circuit arrangement of the card and FIG. 39 shows waveforms in the FIG. 38 circuit arrangement. In this embodiment, the output transistor 9 is on and off controlled so that as shown in FIGS. 38 and 39 the connecting term to the output capacitor 11 is set to one period and the non-connecting term thereto is set to two periods, with the result that the circuit produces a transmission carrier whose frequency is ½ of the power frequency. This allows the transmission carrier to be producible simultaneously with the power reception.

FIGS. 40A to 40C are illustrations of waveforms in the card side or the R/W unit side in this embodiment, which waveforms are obtained from computer simulation analysis. Of these drawings, FIG. 40A shows a waveform (corresponding to A in FIG. 39) in the card side, FIG. 40B shows a received waveform in the R/W unit side, and FIG. 40C shows a signal waveform obtained when the FIG. 40B signal is filtered. As obvious from FIG. 40C, it is possible to provide the frequency being ½ of the power frequency.

Embodiment 20

Figure 41:
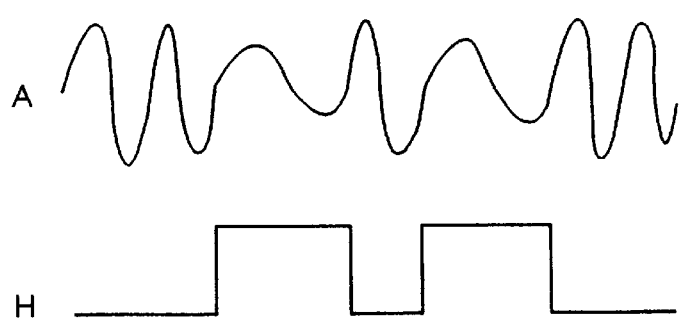
FIG. 41 is a waveform chart useful for describing operations of a non-contact type IC card according to a twentieth embodiment of this invention.
Figures 42A, 42B, 42C:
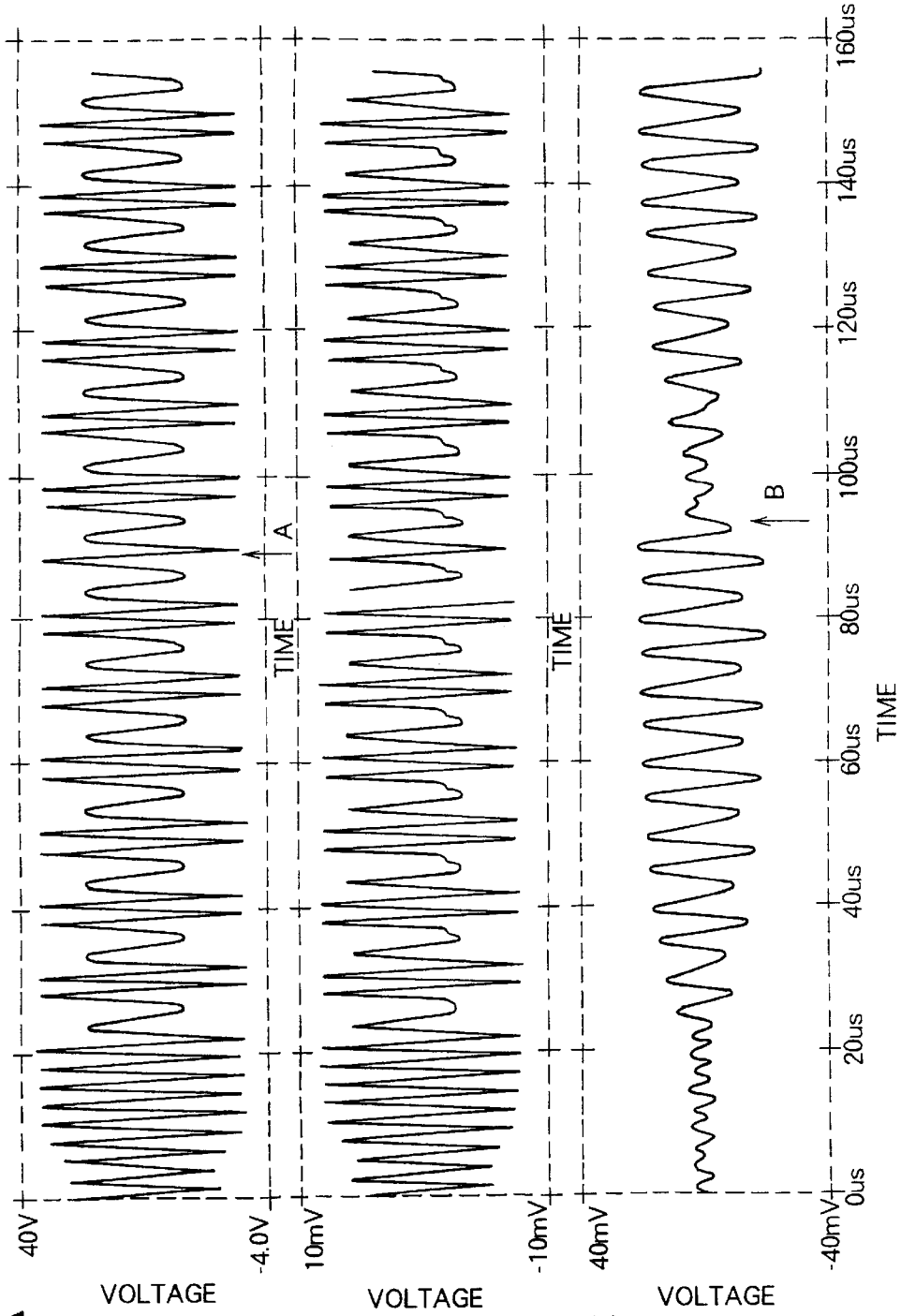
FIGS. 42A to 42C are illustrations of waveforms in a card side and a reading and writing unit side in the twentieth embodiments, which are obtained through computer simulation analysis.
Figure 43:
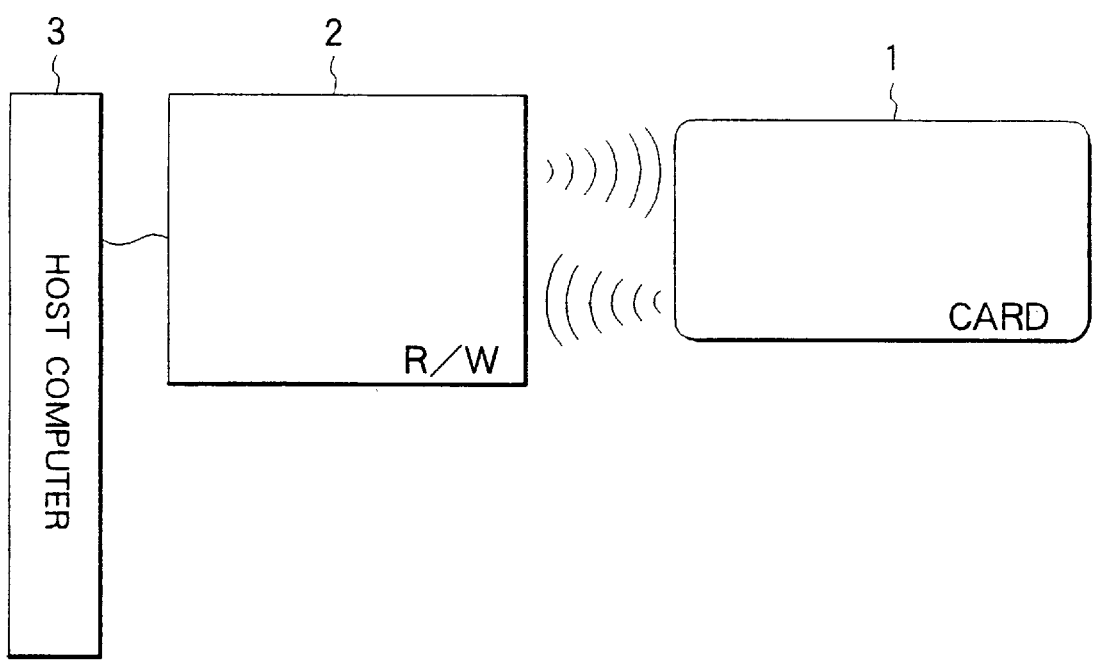
FIG. 43 is an illustration of a known arrangement of a non-contact type IC card system.

Finally, a description will be made hereinbelow of a twentieth embodiment of this invention. A feature of this embodiment is to realize modulation using the arrangement of the nineteenth embodiment. In FIG. 38 circuit, the non-connecting term to the output capacitor 11 is set to one period at modulation as shown in FIG. 41, which can realize the modulation in the binary phase shift keying mode. FIG. 42A to 42C show waveforms in the card or R/W unit side in this embodiment, which waveforms are based on computer simulation analysis. FIG. 42A illustrates a waveform (corresponding to A in FIG. 41) in the card side, FIG. 42 shows a received waveform in the R/W unit side, and FIG. 42C shows a signal waveform obtained by the filtering of the FIG. 42B signal. It is understood from these drawings that a modulation portion indicated by A in FIG. 42A defines the occurrence of a portion indicated by B in FIG. 42C.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A non-contact IC card comprising:
   an antenna resonance circuit including two output terminals; and
   a phase locked loop (PLL) for receiving, as an input signal, a signal representative of a received signal received by the IC card and changing to a negative state, and for producing an output tuned to the input signal, wherein, for phase modulation and/or demodulation, an output signal for half a period is produced as the output of said PLL and both terminals of an antenna resonance circuit are short-circuited during the half period from a zero crossing point of the input signal.

* * * * *